United States Patent
Nishira et al.

(10) Patent No.: US 7,610,121 B2
(45) Date of Patent: Oct. 27, 2009

(54) VEHICLE OPERATION SUPPORT APPARATUS

(75) Inventors: Hikaru Nishira, Yokohama (JP); Taketoshi Kawabe, Fukuoka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 474 days.

(21) Appl. No.: 11/247,378

(22) Filed: Oct. 12, 2005

(65) Prior Publication Data

US 2006/0095193 A1 May 4, 2006

(30) Foreign Application Priority Data

Oct. 29, 2004 (JP) .............................. 2004-316098

(51) Int. Cl.
*G08G 1/16* (2006.01)
(52) U.S. Cl. .......................................... 701/1; 340/901
(58) Field of Classification Search ...................... 701/1, 701/41, 93, 96; 340/901, 903–905
See application file for complete search history.

(56) References Cited

U.S. PATENT DOCUMENTS

| | | | | |
|---|---|---|---|---|
| 5,521,579 A * | 5/1996 | Bernhard | ...................... | 340/438 |
| 5,913,375 A * | 6/1999 | Nishikawa | ................... | 180/168 |
| 5,999,874 A * | 12/1999 | Winner et al. | ................... | 701/93 |
| 6,223,117 B1 * | 4/2001 | Labuhn et al. | ................. | 701/93 |
| 6,233,515 B1 * | 5/2001 | Engelman et al. | ............. | 701/96 |
| 6,330,507 B1 | 12/2001 | Adachi et al. | | |
| 6,675,094 B2 * | 1/2004 | Russell et al. | ................. | 701/301 |
| 6,842,687 B2 * | 1/2005 | Winner et al. | ................... | 701/93 |
| 6,889,161 B2 * | 5/2005 | Winner et al. | ................ | 702/147 |
| 6,968,266 B2 * | 11/2005 | Ahmed-Zaid et al. | ......... | 701/96 |
| 7,162,333 B2 * | 1/2007 | Koibuchi et al. | ............... | 701/1 |

FOREIGN PATENT DOCUMENTS

| | | |
|---|---|---|
| JP | 2000-025487 A | 1/2000 |
| JP | 2000-135934 A | 5/2000 |
| JP | 2000-137900 A | 5/2000 |
| JP | 2003-025868 A | 1/2003 |
| JP | 2003-228800 A | 8/2003 |

\* cited by examiner

*Primary Examiner*—Dalena Tran
(74) *Attorney, Agent, or Firm*—Foley & Lardner LLP

(57) ABSTRACT

A vehicle operation support apparatus includes a vehicle operation plan determination section to determine a vehicle operation plan including a future time series of a selection of a planned target vehicle and a future time series of a selection of a planned target lane position over a prediction horizon of time. The vehicle operation plan determination section includes an operation part to predict a future time series of a state of a vehicle group over the prediction horizon in accordance with a candidate value of the vehicle operation plan, the vehicle group including the host vehicle and each detected vehicle, an operation part configured to perform an evaluation operation of providing a quantitative measure in accordance with the predicted value of the time series vehicle group state, and an operation part configured to generate the vehicle operation plan by optimization based on the evaluation operation.

16 Claims, 13 Drawing Sheets

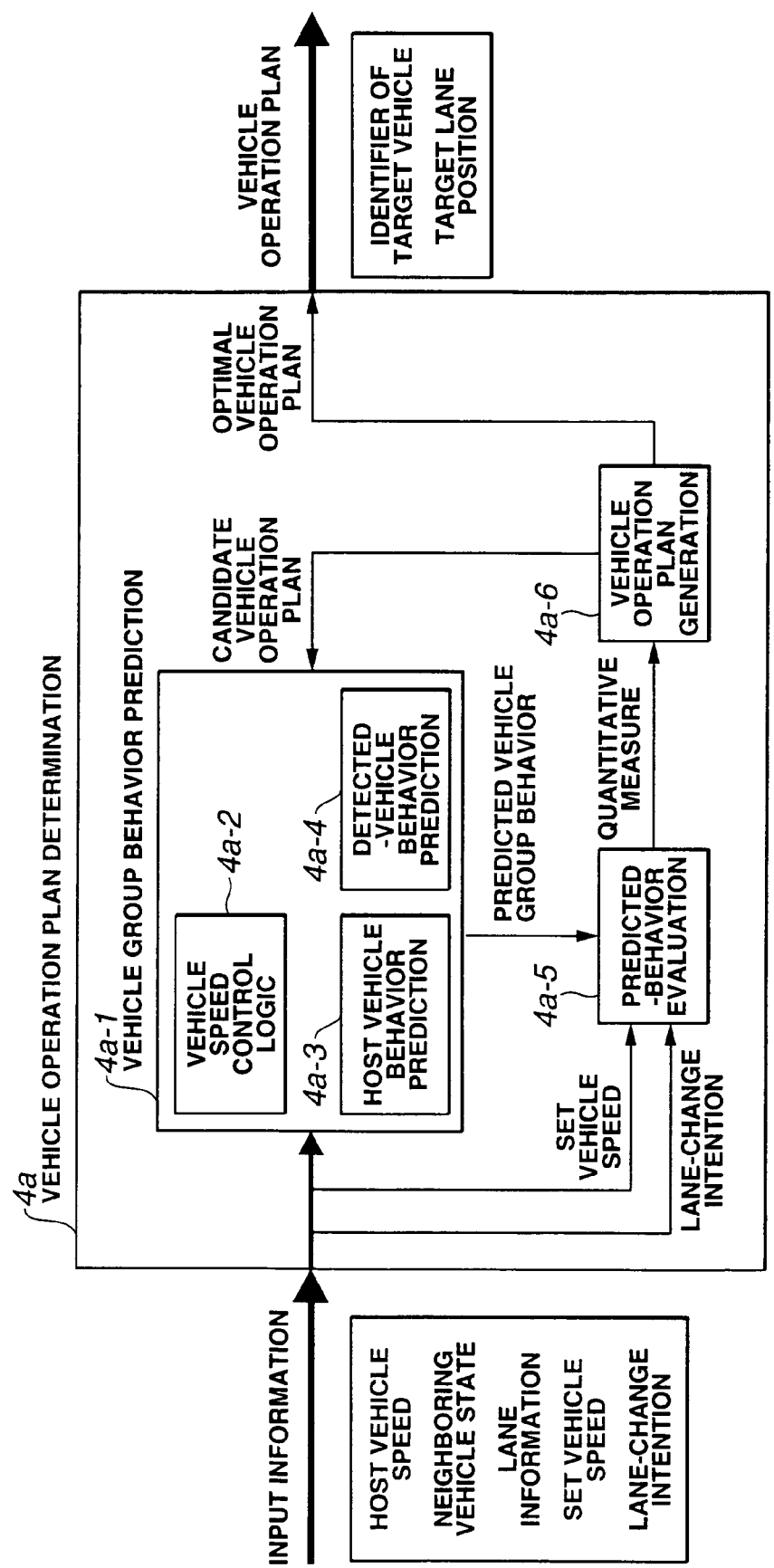

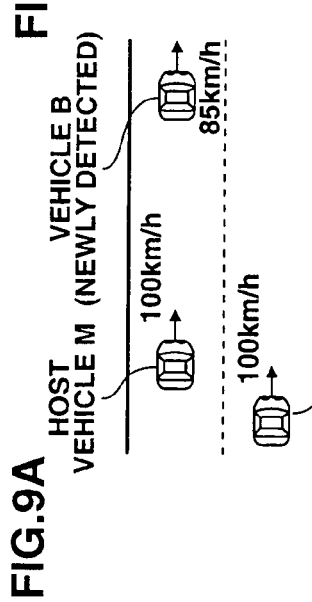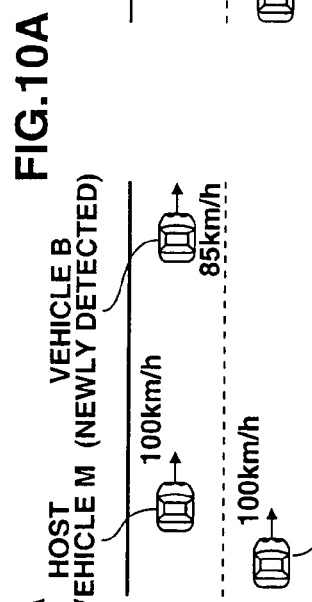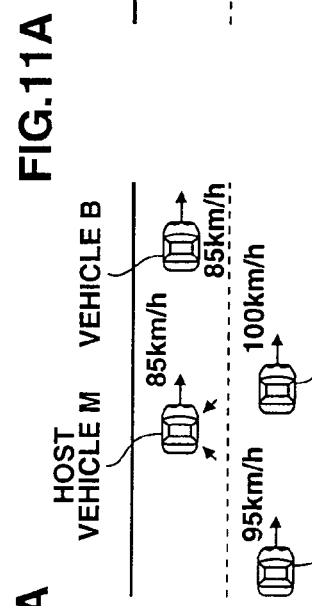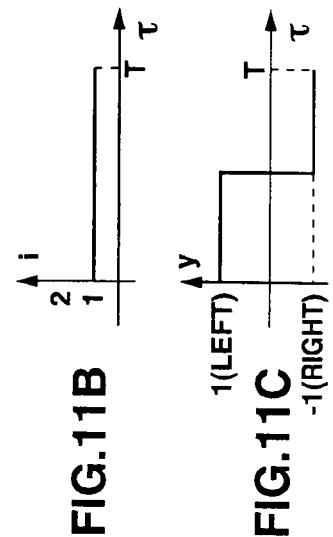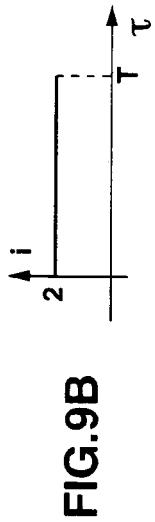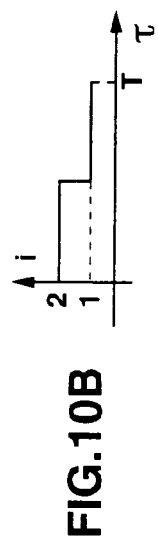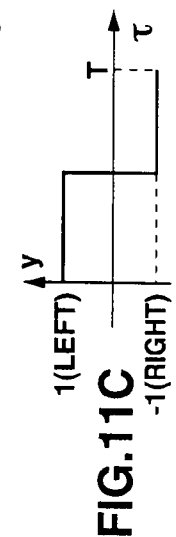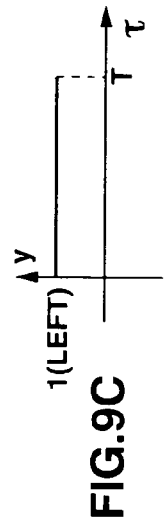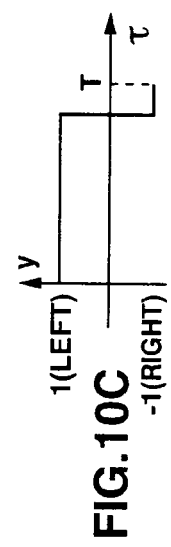

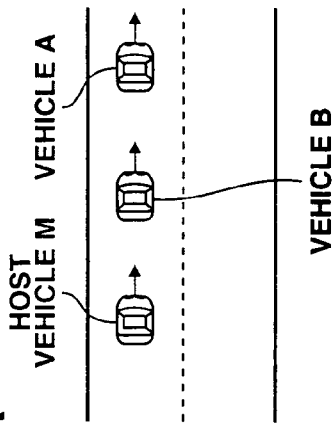
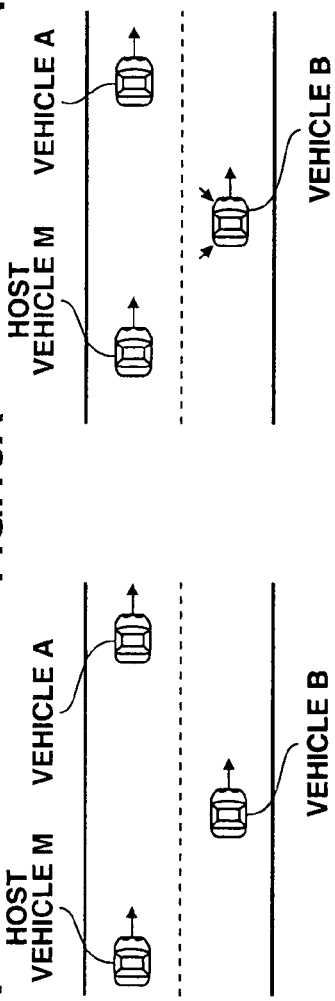
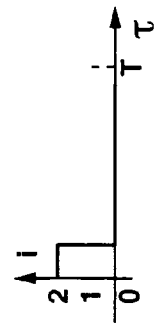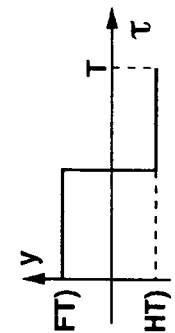
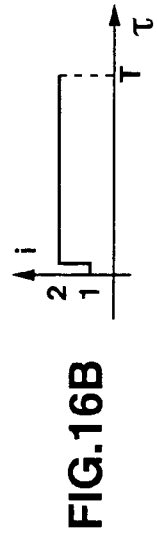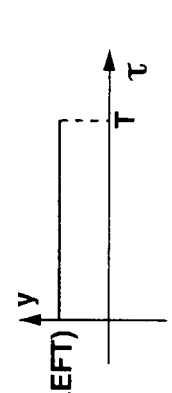
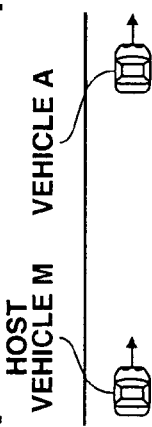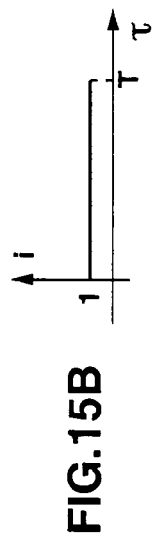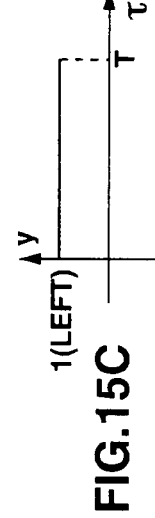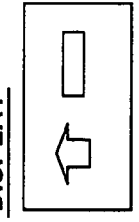

VEHICLE OPERATION SUPPORT APPARATUS

BACKGROUND OF THE INVENTION

The present invention relates generally to apparatus and method of adaptive cruise control and support for automotive vehicles, and more particularly to apparatus and method of adaptive cruise control and support which concerns selection of target vehicle and selection of target lane position.

A Published Japanese Patent Application No. 2000-137900 (hereinafter referred to as "JP2000-137900") shows an adaptive cruise control device, or an inter-vehicle distance control device for supporting an operation of following a target vehicle and also for supporting an operation of performing a lane change. The inter-vehicle distance control device is configured to predict a future lateral position of a neighboring vehicle based on a relative lateral speed of the neighboring vehicle, and to select a target vehicle based on the predicted lateral position, and a current lateral position, of the neighboring vehicle.

SUMMARY OF THE INVENTION

The inter-vehicle distance control device disclosed in JP2000-137900 starts an inter-vehicle distance control operation after the host vehicle starts lane change to actually change the relative lateral position of a neighboring vehicle. Accordingly, it is possible that this conventional inter-vehicle distance control device performs a late lane change or performs no smooth lane change in some cases. Thus, the conventional inter-vehicle distance control operation depends on actual movement of the host vehicle based on driver's operation.

Accordingly, it is an object of the present invention to smoothly perform a vehicle operation support operation in accordance with an environmental situation around a host vehicle.

According to one aspect of the present invention, a vehicle operation support apparatus comprises: an input section including: a vehicle detection section configured to detect a vehicle present on a road where a host vehicle is present; and a lane detection section configured to detect a lane of the road; and a control unit connected for signal communication to the input section, the control unit including: a vehicle operation plan determination section to determine a vehicle operation plan including a future time series of a selection of a planned target vehicle and a future time series of a selection of a planned target lane position over a prediction horizon of time; the vehicle operation plan determination section including: a vehicle group behavior prediction operation part to predict a future time series of a state of a vehicle group over the prediction horizon in accordance with a candidate value of the vehicle operation plan, the vehicle group including the host vehicle and each detected vehicle; a predicted-behavior evaluation operation part configured to perform an evaluation operation of providing a quantitative measure in accordance with the predicted value of the time series vehicle group state; and a vehicle operation plan generation operation part configured to generate the vehicle operation plan by optimization based on the evaluation operation, the vehicle group behavior prediction operation part including: a vehicle speed control logic operation part configured to provide a normative value of a time series of a control input to the host vehicle over a control horizon of time in accordance with the candidate value of the vehicle operation plan; a host vehicle behavior prediction operation part configured to predict a time series of a state of the host vehicle over the prediction horizon in accordance with the normative value of the time series control input and the candidate value of the vehicle operation plan; and a detected-vehicle behavior prediction operation part configured to predict a future time series of a state of each detected vehicle over the prediction horizon. The vehicle operation support apparatus may further comprise an output section configured to regulate the control input in accordance with a control input command and connected for signal communication to the control unit, and the control unit may include: a target vehicle determination section configured to select a current target vehicle in accordance with the vehicle operation plan; and a control input determination section configured to set the control input command to a normative value of the control input in accordance with the selection of the current target vehicle.

According to another aspect of the invention, a vehicle operation support apparatus comprises: input means for including: vehicle detection means for detecting a vehicle present on a road where a host vehicle is present; and lane detection means for detecting a lane of the road; and control means for including: vehicle operation plan determination means for determining a vehicle operation plan including a future time series of a selection of a planned target vehicle and a future time series of a selection of a planned target lane position over a prediction horizon of time; the vehicle operation plan determination means including: vehicle group behavior prediction operation means for predicting a future time series of a state of a vehicle group over the prediction horizon in accordance with a candidate value of the vehicle operation plan, the vehicle group including the host vehicle and each detected vehicle; predicted-behavior evaluation operation means for performing an evaluation operation of providing a quantitative measure in accordance with the predicted value of the time series vehicle group state; and vehicle operation plan generation operation means for generating the vehicle operation plan by optimization based on the evaluation operation, the vehicle group behavior prediction operation means including: vehicle speed control logic operation means for providing a normative value of a time series of a control input to the host vehicle over a control horizon of time in accordance with the candidate value of the vehicle operation plan; host vehicle behavior prediction operation means for predicting a time series of a state of the host vehicle over the prediction horizon in accordance with the normative value of the time series control input and the candidate value of the vehicle operation plan; and detected-vehicle behavior prediction operation means for predicting a future time series of a state of each detected vehicle over the prediction horizon.

According to a further aspect of the invention, a vehicle operation support method comprises: an input operation including: a vehicle detection operation of detecting a vehicle present on a road where a host vehicle is present; and a lane detection operation of detecting a lane of the road; and a control operation including: a vehicle operation plan determination operation of determining a vehicle operation plan including a future time series of a selection of a planned target vehicle and a future time series of a selection of a planned target lane position over a prediction horizon of time; the vehicle operation plan determination operation including: a vehicle group behavior prediction operation of predicting a future time series of a state of a vehicle group over the prediction horizon in accordance with a candidate value of the vehicle operation plan, the vehicle group including the host vehicle and each detected vehicle; a predicted-behavior evaluation operation of performing an evaluation operation of providing a quantitative measure in accordance with the predicted value of the time series vehicle group state; and a vehicle operation plan generation operation of generating the vehicle operation plan by optimization based on the evaluation operation, the vehicle group behavior prediction operation including: a vehicle speed control logic operation of providing a normative value of a time series of a control input to the host vehicle over a control horizon of time in accordance with the candidate value of the vehicle operation plan; a host vehicle behavior prediction operation of predicting a time series of a state of the host vehicle over the prediction horizon in accordance with the normative value of the time series control input and the candidate value of the vehicle operation plan; and a detected-vehicle behavior prediction operation of predicting a future time series of a state of each detected vehicle over the prediction horizon. The vehicle operation support method may further comprise an output operation of regulating the control input in accordance with a control input command, and the control operation may include: a target vehicle determination operation of selecting a current target vehicle in accordance with the vehicle operation plan; and a control input determination operation of setting the control input command to a normative value of the control input in accordance with the selection of the current target vehicle.

BRIEF DESCRIPTION OF THE DRAWINGS

FIG. 5 is a functional block diagram of a vehicle operation plan determination section of the vehicle operation support apparatus of FIG. 1.

FIGS. 9A through 9D are views illustrating a first situation of a sample case in which the vehicle operation support apparatus of FIG. 1 operates.

FIGS. 10A through 10D are views illustrating a second situation of the sample case in which the vehicle operation support apparatus of FIG. 1 operates.

FIGS. 11A through 11D are views illustrating a third situation of the sample case in which the vehicle operation support apparatus of FIG. 1 operates.

FIGS. 15A through 15D are views illustrating a first situation of a sample case in which the vehicle operation support apparatus of FIG. 12 operates.

FIGS. 16A through 16D are views illustrating a second situation of the sample case in which the vehicle operation support apparatus of FIG. 12 operates.

FIGS. 17A through 17D are views illustrating a third situation of the sample case in which the vehicle operation support apparatus of FIG. 12 operates.

DETAILED DESCRIPTION OF THE INVENTION

Figure 1:
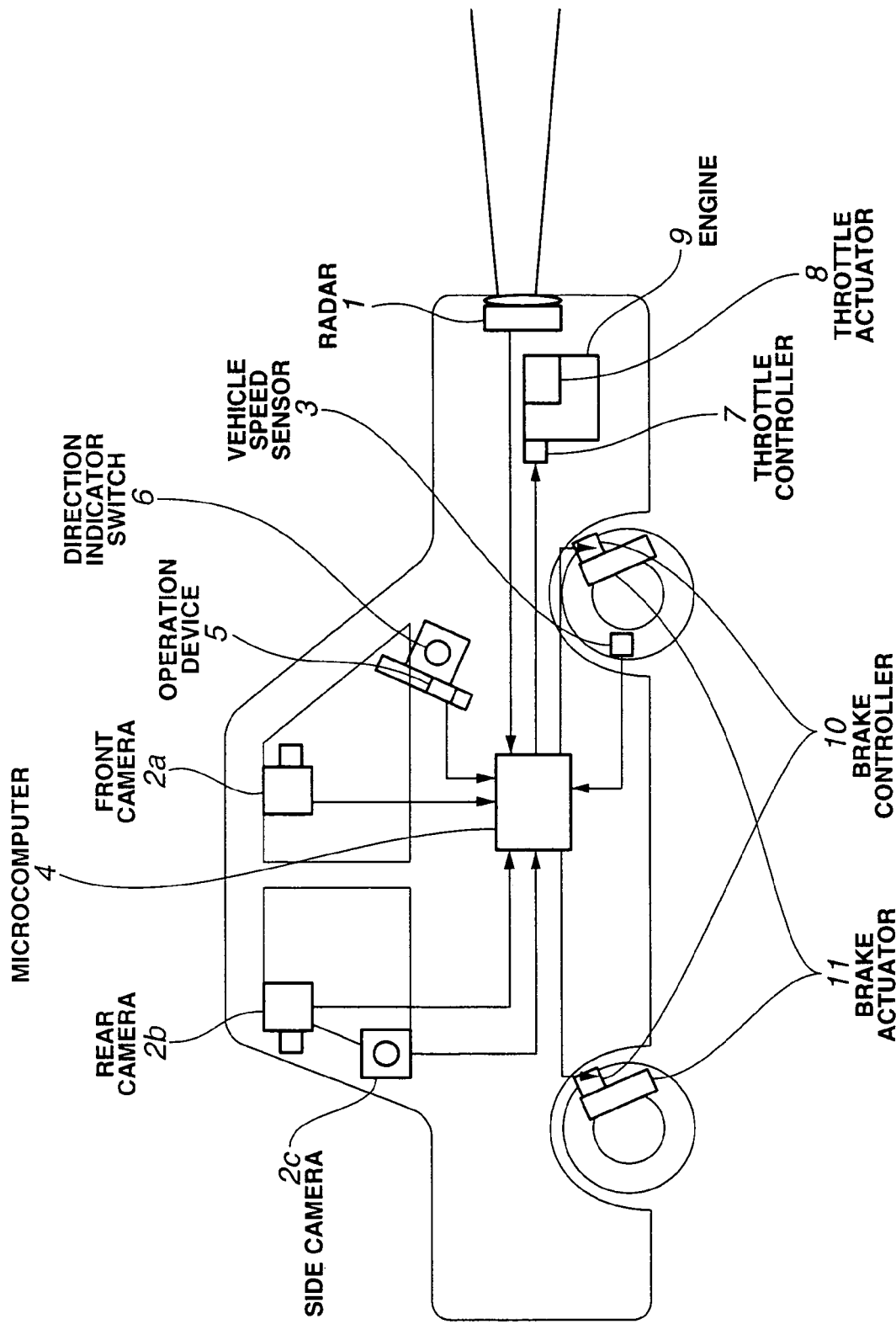
FIG. 1 is a schematic diagram depicting an automotive vehicle equipped with a vehicle operation support apparatus in accordance with a first embodiment.

Referring now to FIGS. 1 through 11D, there is shown a vehicle operation support apparatus (an inter-vehicle distance control apparatus) in accordance with a first embodiment. FIG. 1 is a schematic diagram depicting an automotive vehicle equipped with a vehicle operation support apparatus in accordance with the first embodiment. As shown in FIG. 1, the vehicle operation support apparatus is configured on the body of the automotive vehicle as a host vehicle, including a radar 1, a front camera 2$a$, a rear camera 2$b$, a side camera 2$c$, a vehicle speed sensor 3, a microcomputer 4, an operation device 5, a direction indicator switch 6, a throttle controller 7, a throttle actuator 8, an engine 9, a brake controller 10, and a brake actuator 11. Radar 1 is mounted on a front portion of the vehicle body to detect potentially hazardous objects, or moving objects, or neighboring vehicles present in front of the host vehicle, and to measure the position of each detected neighboring vehicle. Front camera 2$a$ includes a CCD camera, and is mounted on a front portion of the vehicle body to monitor or recognize or identify lane configuration or driving lanes of a road by detecting white marking lines on the road. Rear camera 2$b$ is attached to a rear portion of the vehicle body to detect neighboring vehicles present rearward of the host vehicle, and to measure the position of each detected neighboring vehicle. Side camera 2$c$ is mounted on each side of the vehicle body to detect neighboring vehicles present in a space that radar 1 and rear camera 2$b$ are disable to monitor, and to measure the position of each detected neighboring vehicle. Vehicle speed sensor 3 includes a rotary encoder mounted at a road wheel of the vehicle. The rotary encoder of vehicle speed sensor 3 generates periodical pulse signals whose period changes in accordance with the rotational speed of the road wheel. Thus, vehicle speed sensor 3 serves as a host vehicle speed measurement section to measure the vehicle speed, i.e. the driving speed or the longitudinal speed of the host vehicle, in accordance with the periodical pulse signals from the rotary encoder.

Figure 2:
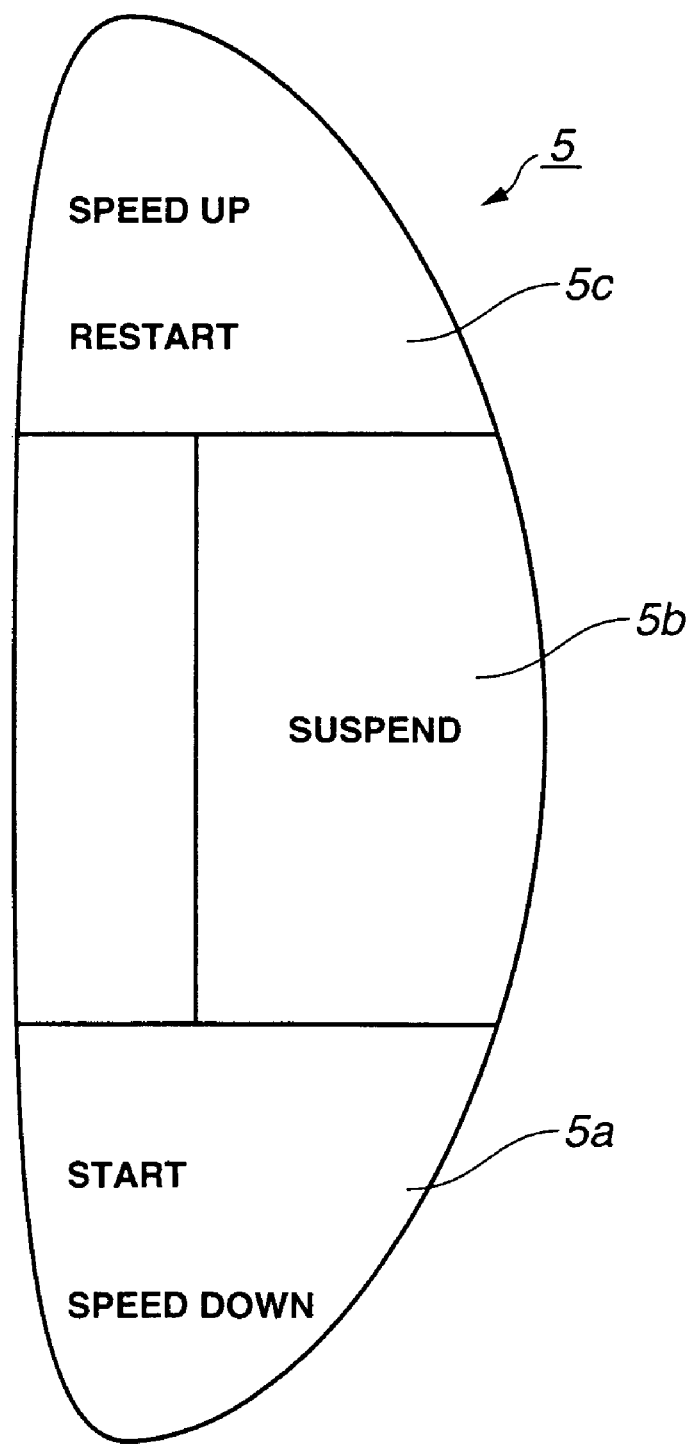
FIG. 2 is a schematic diagram depicting a detailed construction of an operation device of the vehicle operation support apparatus of FIG. 1.

Operation device 5 is attached to the steering wheel of the vehicle, serving as a desired vehicle speed setting section, in this embodiment. FIG. 2 is a schematic diagram depicting a detailed construction of operation device 5. As shown in FIG. 2, operation device 5 includes a plurality of manually-operable operation buttons 5$a$, 5$b$, and 5$c$ configured to send instructions of start of a control operation mode, suspension of the control operation mode, and a set vehicle speed as a desired vehicle speed. In this embodiment, the control operation mode is a mode of a vehicle speed control (an inter-vehicle distance control). When operation button 5$a$ is pressed, the set vehicle speed is set to the vehicle speed at the instant that operation button 5$a$ is pressed, and the control operation mode is brought to be active. When operation button 5$b$ is pressed, the control operation mode is suspended. When operation button 5$c$ is pressed during the control operation mode being suspended, the control operation mode is restarted with the set vehicle speed being set to the previous value at the instant that the control operation mode is suspended. During the control operation mode being active, pressing operation button 5a reduces the set vehicle speed, and pressing operation button 5c increases the set vehicle speed. In accordance with the above-mentioned functions, operation buttons 5a, 5b, and 5c are given with indicators, that is, "speed up/start", "suspend", and "restart/speed down", respectively.

Referring back to FIG. 1, direction indicator switch 6 is formed of a manually-operable lever movable in two directions. With direction indicator switch 6 displaced to be in end positions, left and right direction indicators of the vehicle is lighted. In addition, direction indicator switch 6 serves as a lane-change intention detection section or as an interface for sending to microcomputer 4 a data signal of a driver's intention of lane change or lane selection and the direction of an intended target lane.

Throttle controller 7 is configured to receive from microcomputer 4 a control command signal indicative of a desired throttle opening, and to control the throttle opening in accordance with the desired throttle opening by means of throttle actuator 8. Brake controller 10 is configured to receive from microcomputer 4 a control command signal indicative of a desired brake apply pressure, and to control the brake apply pressure in accordance with the desired brake apply pressure by means of brake actuator 11. Throttle controller 7, throttle actuator 8, engine 9, brake controller 10, and brake actuator 11 serve as an output section to regulate a control input to the host vehicle in accordance with a control input command. The control input is a longitudinal acceleration of the host vehicle. The output section is configured to regulate the longitudinal acceleration by adjusting a wheel torque of the host vehicle in accordance with a longitudinal acceleration command from microcomputer 4.

Figure 3:
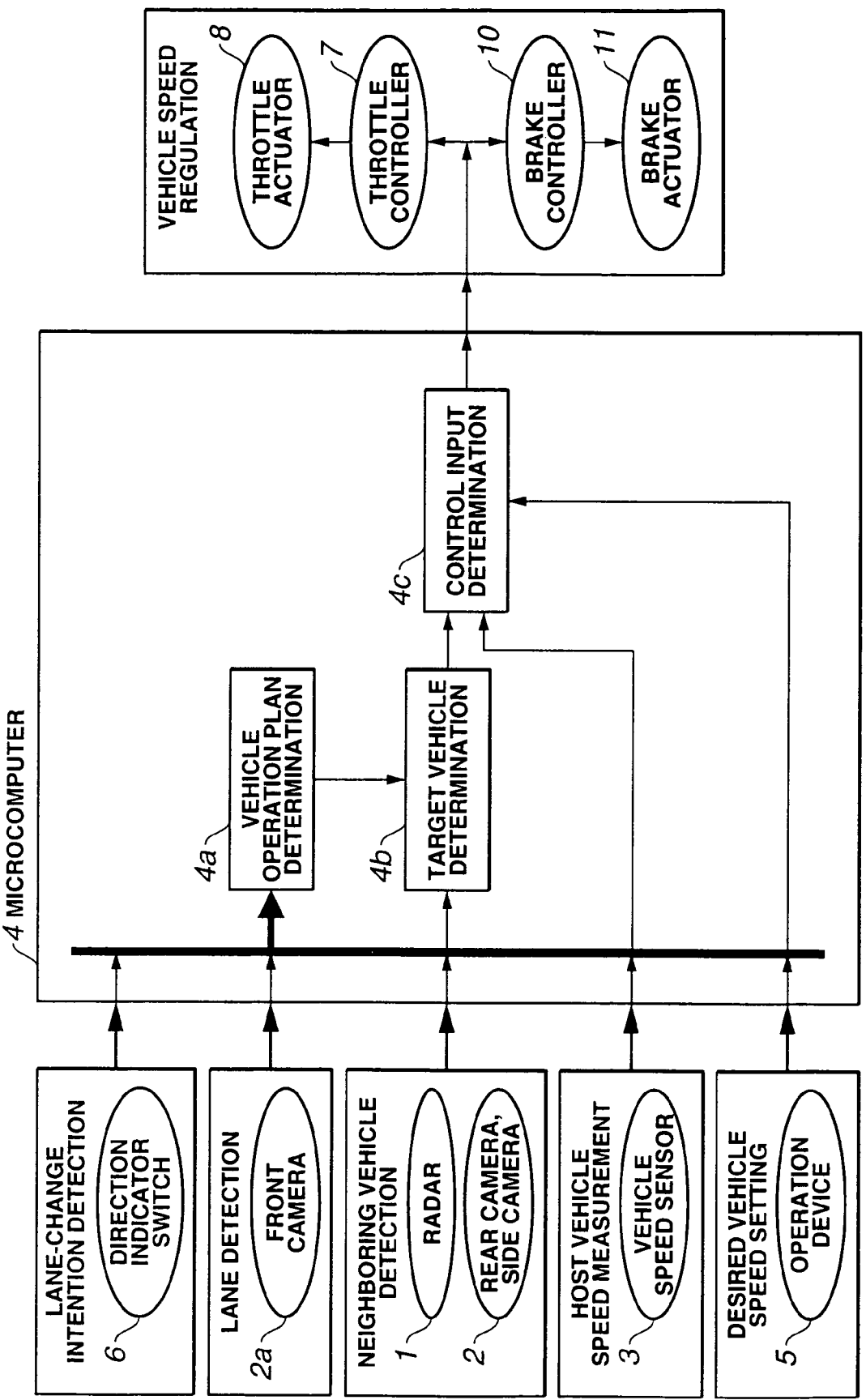
FIG. 3 is a functional block diagram of the vehicle operation support apparatus of FIG. 1.

Microcomputer 4 includes a microprocessor and peripheral devices, serving as an electrical control unit of the vehicle operation support apparatus. Microcomputer 4 is configured to receive data signals from an input section including radar 1, front camera 2a, rear camera 2b, side camera 2c, vehicle speed sensor 3, operation device 5, and direction indicator switch 6, to process the data signals using a program stored in its internal memory, and to output the control commands to a vehicle speed regulation section or an output section, specifically, to throttle controller 7 and brake controller 10 accordingly. FIG. 3 is a functional block diagram of the vehicle operation support apparatus of FIG. 1. Microcomputer 4 includes three software modules 4a, 4b, and 4c indicated by functional blocks in FIG. 3.

Figure 4:
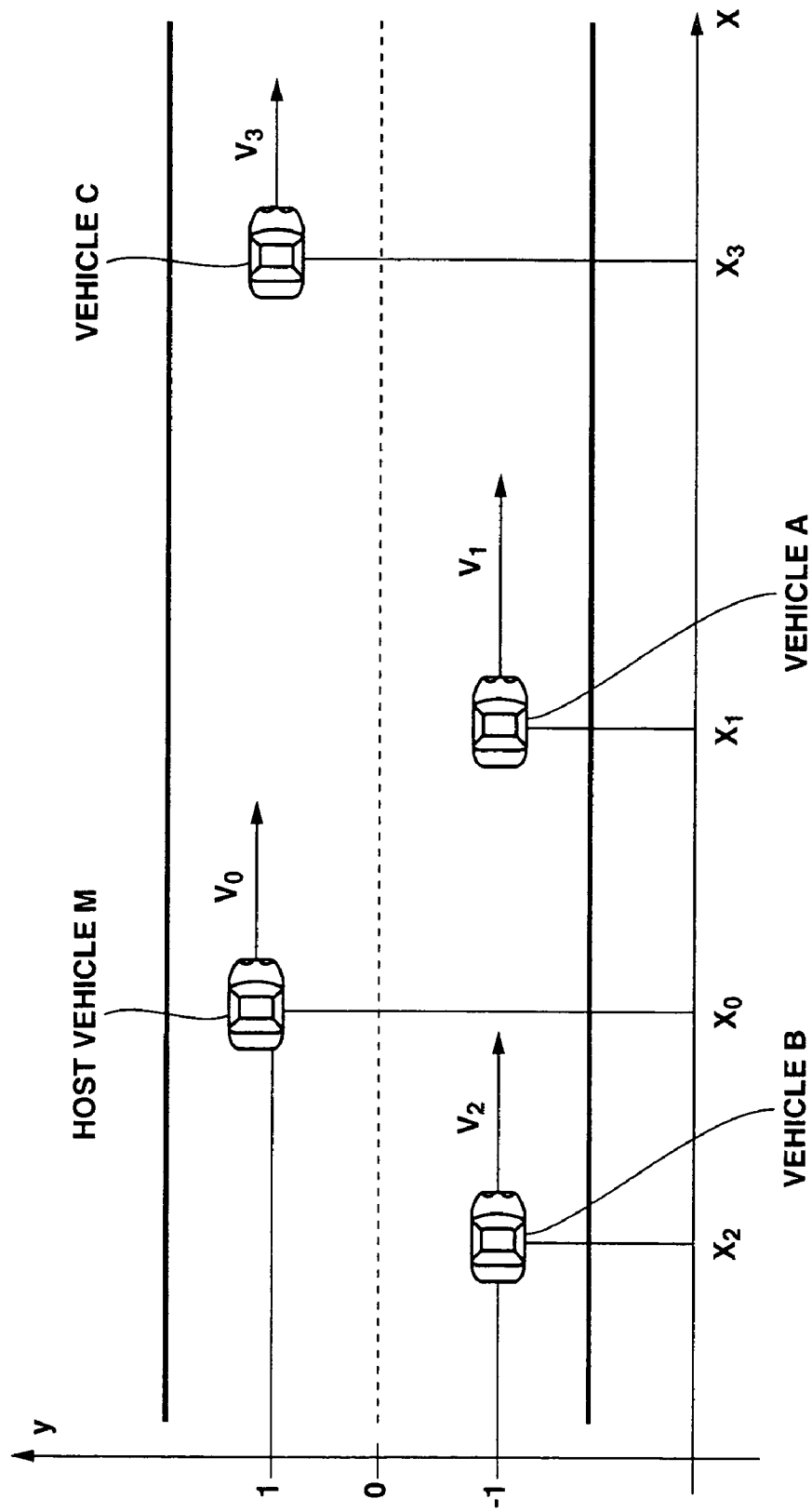
FIG. 4 is a view illustrating a sample situation where the vehicle operation support apparatus of FIG. 1 operates.

FIG. 4 is a view illustrating a sample situation where the vehicle operation support apparatus of FIG. 1 operates. The following describes specific operations of the functional blocks 4a, 4b, and 4c of microcomputer 4, using the sample situation of FIG. 4. FIG. 4 shows a two-lane one-way road (a four-lane road). Vehicles A and B are traveling in the right lane. A host vehicle M and a vehicle C are traveling in the left lane. The vehicle speeds of vehicles A and B are higher than the vehicle speeds of host vehicle M and vehicle C. In this situation, the driver of host vehicle M has an intention of lane change to the right lane for some reasons. However, the driver hesitates for performing lane change, since vehicles A and B are traveling in the right lane.

As shown in FIG. 4, there is introduced a coordinate system for mathematical modeling. The x-axis is defined to extend along the road, and the y-axis is defined to extend normal to the x-axis in the horizontal plane. The x-axis is referred to as a longitudinal direction. The y-axis is referred to as a lateral direction. The zero point of the x-axis may be located at any point, because the relative distance between host vehicle M and each of other vehicles A, B, and C is used in the actual control computation. The zero point of the y-axis is located at the lane-marking line which divides between the left lane and the right lane. The scale of the y-axis is normalized so that the y-coordinate of the center line of the left lane is 1, and the y-coordinate of the center line of the right lane is −1. Host vehicle M, vehicles A, B, and C are given denotations "0", "1", "2", and "3", respectively. More specifically, the x-position, the longitudinal speed, the y-position, of each of the vehicles concerned are represented by $x_i$, $v_i$, and $y_i$ (i=0,1,2,3) respectively.

Radar 1, and cameras 2a, 2b, 2c serve as a vehicle detection section to detect neighboring vehicles present on a road where the host vehicle is present. The detected vehicles are each assigned to with a unique identifier number (ID number) in the data processing of microcomputer 4, and identified and managed with the ID number until the vehicle detection section loses track of the detected vehicles. In the sample situation as shown in FIG. 4, host vehicle M, and vehicles A, B, C are assigned to with ID numbers of 0, 1, 2, and 3, respectively.

When a neighboring vehicle is detected, the vehicle detection section measures a vehicle-to-vehicle distance or an inter-vehicle distance as a distance between host vehicle M and the detected vehicle along the longitudinal direction. Specifically, in the situation of FIG. 4, the vehicle detection section measures distances $x_1$-$x_0$, $x_2$-$x_0$, and $x_3$-$x_0$. With the position $x_0$ of host vehicle M being arbitrarily set, $x_0$, $x_1$, $x_2$, and $x_3$ are determined.

The vehicle detection section also measures a relative lateral position of each detected vehicle with respect to host vehicle M. On the other hand, front camera 2a serves as a lane detection section to detect lanes of the road, or lane configuration of the road. $y_0$, $y_1$, $y_2$, and $y_3$ are determined by comparing the relative lateral positions and the lane information.

The vehicle detection section is configured to calculate the rate of change in each inter-vehicle distance with respect to time, to obtain an approximate value of the relative longitudinal speed of each detected vehicle $v_1$-$v_0$, $v_2$-$v_0$, and $v_3$-$v_0$. On the other hand, vehicle speed sensor 3 measures the host vehicle speed $v_0$. Therefore, the longitudinal vehicle speeds with respect to the ground $v_0$, $v_1$, $v_2$, and $v_3$ are determined.

Referring back to FIG. 3, the above-mentioned measured data of host vehicle M and neighboring vehicles A, B, C are sent to vehicle operation plan determination section 4a, target vehicle determination section 4b, and control input determination section 4c.

FIG. 5 is a functional block diagram of vehicle operation plan determination section 4a. As shown in FIG. 5, vehicle operation plan determination section 4a includes operation parts 4a-1 through 4a-6 indicated by functional blocks. Vehicle operation plan determination section 4a is configured to determine a suitable vehicle operation plan or strategy in accordance with input information including the host vehicle speed, the neighboring vehicle state, the lane information, the desired vehicle speed, and the driver's intention of lane-change. The vehicle operation plan includes a future time series of a selection of a planned target vehicle and a future time series of a selection of a planned target lane position over a prediction horizon of time. Specifically, the vehicle operation plan includes a future time series of a target vehicle identifier $i^*(\tau)$ indicative of the ID number of a planned target vehicle for inter-vehicle distance control, and a time series of a planned target lane position $y^*(\tau)$, over a prediction horizon of time from a current instant t to a future instant t+T, where $\tau$ represents a future instant within the prediction horizon.

Figure 6A:
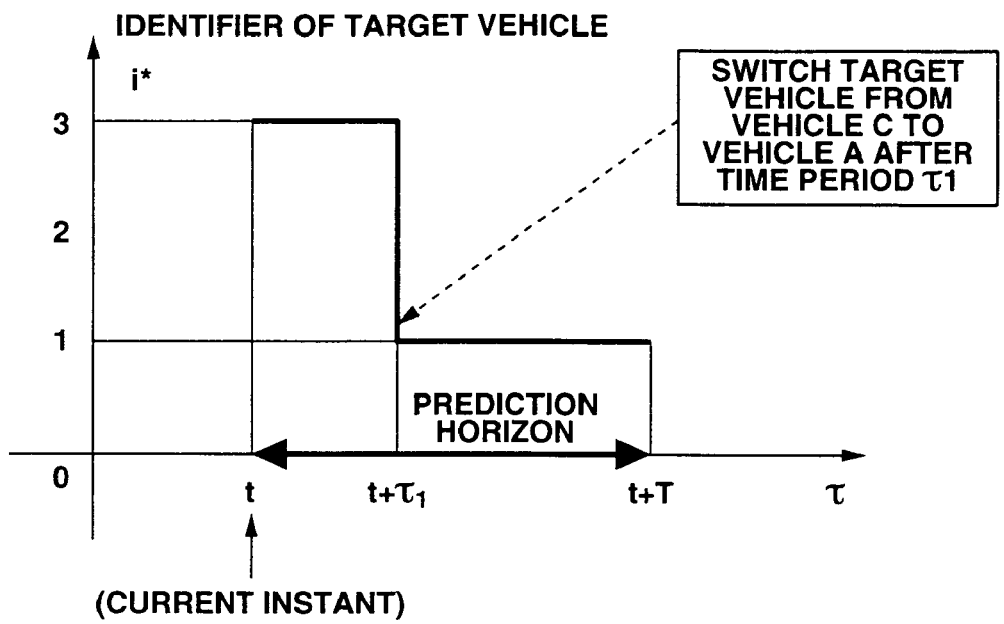
FIGS. 6A and 6B are views illustrating a sample output produced by the vehicle operation plan determination section of the vehicle operation support apparatus of FIG. 1.
Figure 6B:
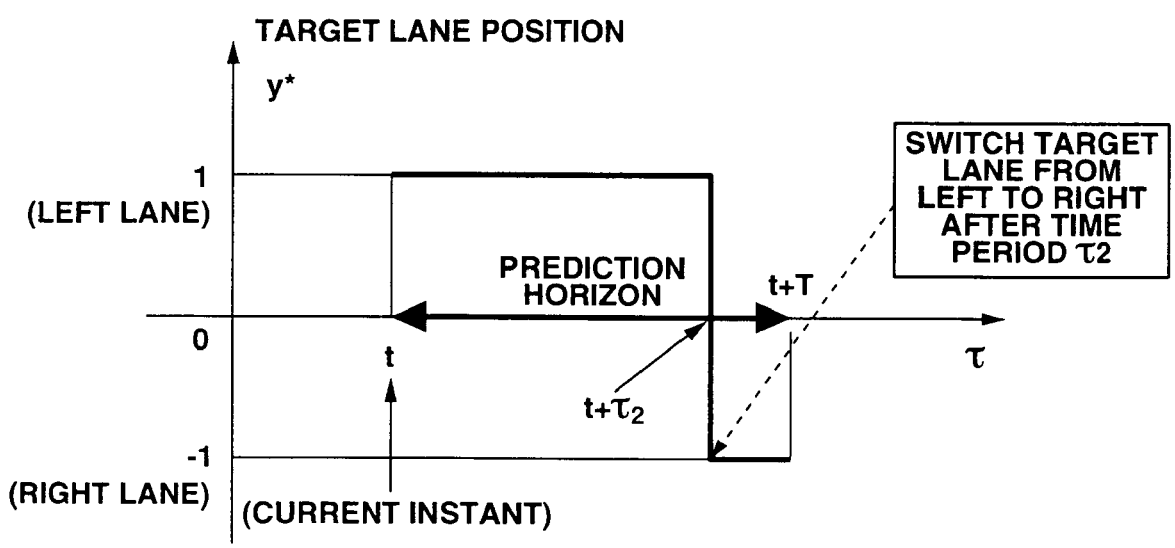

FIGS. 6A and 6B are views illustrating a sample output produced by vehicle operation plan determination section 4a in the situation of FIG. 4. As shown in FIGS. 6A and 6B, the produced vehicle operation plan indicates that the planned target vehicle is switched from vehicle C to vehicle A time $\tau_1$ later, while the target lane is switched from the left lane to the right lane time $\tau_2$ later. It means that host vehicle M follows vehicle C as the planned target vehicle over time period $\tau_1$ from the current instant, to increase the inter-vehicle distance between host vehicle M and vehicle A, that after that host vehicle M speeds up to follow vehicle A, and that host vehicle M starts lane change to ride the flow of the right lane after time $\tau_2$ from the current instant. The specific computational algorithm of determining vehicle operation plan is described later.

Referring back to FIG. 3, target vehicle determination section 4b is configured to select a current target vehicle, i.e. a preceding vehicle as a current target for inter-vehicle distance control, from the detected neighboring vehicles, in accordance with the output from vehicle operation plan determination section 4a, and sends data on the selected current target vehicle to control input determination section 4c. In this embodiment, the current target vehicle is set to a vehicle assigned with a current value of the target vehicle identifier in the vehicle operation plan. In other words, target vehicle determination section 4b is configured to determine the current target vehicle to be identical to a current selection of the planned target vehicle in accordance with the vehicle operation plan.

Control input determination section 4c is configured to receive a vector data $x_p$ as described by the following equation (1).

$$x_p = (x_1 - x_0 v_1 - v_0 v_1)^T \quad (1)$$

where T represents a transposed matrix of an argument. In case vehicle C is selected as the current target vehicle in the situation of FIG. 4, the vector data $x_p$ are described by the following equation.

$$x_p = (x_3 - x_0 v_3 - v_0 v_3)^T \quad (2)$$

If the preceding vehicle as the target of the inter-vehicle distance control is not selected in such a situation that no vehicle is detected ahead of the host vehicle, a signal indicative of absence of the current target vehicle is sent in a suitable format to control input determination section 4c. Control input determination section 4c is also configured to receive host vehicle speed $v_0$ and set vehicle speed $v_0^*$ in addition to the data on the current target vehicle.

Control input determination section 4c is configured to compute a normative control input command to be generated by actuators 8, 11 for the inter-vehicle distance control, in accordance with the target vehicle information, the host vehicle speed, and the set vehicle speed, and to send the control input commands to controllers 7, 10 for controlling actuators 8, 11. The processing of control input determination section 4c roughly consists of two parts, the computation of the setpoint of a controlled variable to realize a follow-up characteristic in conformance with the driver's driving feeling, and the computation of the control input of the actuators required in order to realize the computed amount of target control.

In this embodiment, the host vehicle speed is a controlled variable of the inter-vehicle distance control. The above-mentioned computation of the setpoint of the controlled variable is implemented by a controller for outputting a target vehicle speed $v_c$ based on input of the neighboring vehicle information $x_p$, the host vehicle speed $v_0$, and the set vehicle speed $v_0^*$. Such an inter-vehicle distance control may be implemented by an algorithm disclosed in Published Japanese Patent Application No. 2000-135934 (hereinafter referred to as "JP2000-135934"). In JP2000-135934, the algorithm for computing the target vehicle speed is constructed as a Linear Parameter Varying (LPV) system, described by the following equations of state.

$$\dot{x}_{ACC} = A(\theta) x_{ACC} + B(\theta) \begin{pmatrix} x_p \\ v_0 \end{pmatrix} \quad (3)$$

$$v_c = C(\theta) x_{ACC}$$

where $x_{ACC}$ is a quantity of state of a controller, $\theta$ is a vector of input to the controller, and $A(\theta)$, $B(\theta)$, and $C(\theta)$ are matrices as functions of $\theta$ for describing the system. $\theta$ is described by the following equation.

$$\theta = (x_p v_0 v_0^*)^T \quad (4)$$

When no current target vehicle is selected, control input determination section 4c determines and outputs the target vehicle speed using an algorithm of speed control of regulating the host vehicle speed to the set vehicle speed, so that the host vehicle speed varies in conformance with the driver's driving feeling. Thus, control input determination section 4c is configured to set the control input command so as to provide a desired inter-vehicle distance between the host vehicle and the current target vehicle when the current target vehicle is present, and to set the control input command so as to adjust the vehicle speed to the desired vehicle speed during the current target vehicle being absent. The above-mentioned control is wholly referred to as a vehicle speed control in the embodiments.

The above-mentioned computation of the control input to the actuators in control input determination section 4c is formulized as a problem of model matching control of controlling the host vehicle speed $v_0$ based on the target vehicle speed $v_c$ using the following equation (5).

$$\dot{v}_0 = -\omega_V v_0 + \omega_V v_c \quad (5)$$

where $\omega_V$ is a parameter equivalent to the reciprocal of the time constant of a control system. A model matching control system may be designed using a well-known design technique, for example, using the method disclosed in Published Japanese Patent Application No. 2000-025487. By using the above design technique, control input determination section 4c is configured to compute a control input command $u_{TVO}^*$ for throttle actuator 8 and a control input command $u_{BLP}^*$ for brake actuator 11, and to send the control input commands to controllers 7 and 10.

Figure 7:
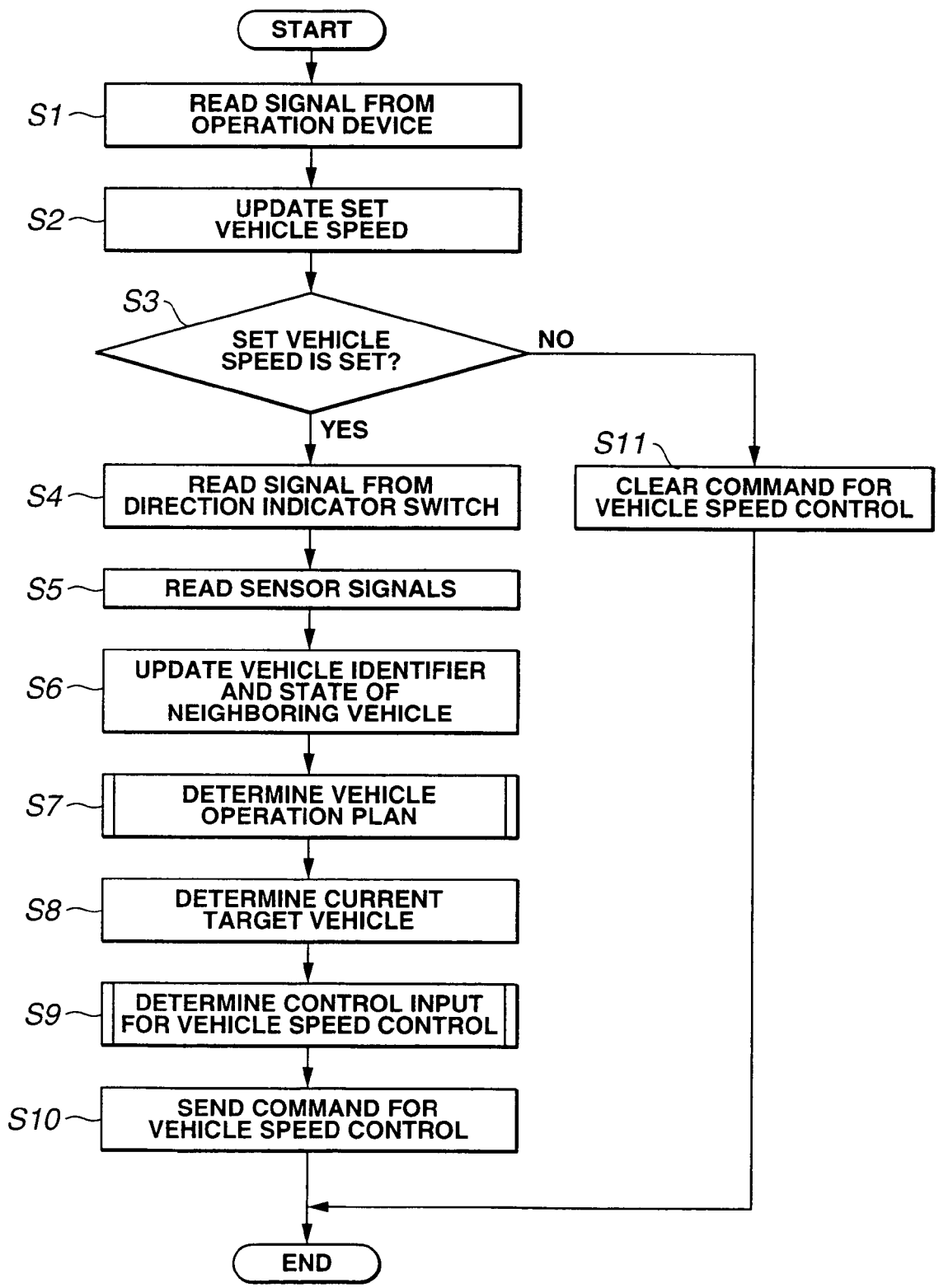
FIG. 7 is a flow chart depicting a routine to be executed by a microcomputer of the vehicle operation support apparatus of FIG. 1.

FIG. 7 is a flow chart depicting a routine to be executed by microcomputer 4. First, at step S1, microcomputer 4 detects the operational state of operation device 5. Subsequent to step S1, at step S2, microcomputer 4 updates the set vehicle speed in accordance with the operational state of operation device 5. When no operation of operation device 5 is detected, the set vehicle speed is held at its last setting in the last processing routine. Subsequent to step S2, at step S3, microcomputer 4 determines whether or not the set vehicle speed is set. For example, in case button 5b of operation device 5 is pressed to suspend the control operation mode, the set value is not set. When the answer to step S3 is affirmative (YES), the routine proceeds to step S11, in order to discontinue execution of the inter-vehicle distance control. At step S11, microcomputer 4 clears the commands to actuators 8, 11, and the routine returns. On the other hand, when the answer to step S3 is negative (NO), the routine proceeds to step S4, in order to perform the inter-vehicle distance control. At step S4, microcomputer 4 reads the operational state of direction indicator switch 6. Subsequent to step S4, at step S5, microcomputer 4 reads each sensor signal of radar 1, cameras 2a, 2b, 2c, and vehicle speed sensor 3. Subsequent to step S5, at step S6, microcomputer 4 compares detected data on neighboring vehicles with the last detected data in the last processing routine, updates the ID number of each detected vehicle, and computes the position of each detected vehicle. Subsequent to step S6, at step S7, microcomputer 4 performs the processing of vehicle operation plan determination section 4a, to produce signals indicative of the target vehicle identifier and the target lane position. Subsequent to step S7, at step S8, target vehicle determination section 4b of microcomputer 4 selects the current target vehicle for the inter-vehicle distance control based on the output of vehicle operation plan determination section 4a, and generates the corresponding vehicle data in the form of the equation (1). Subsequent to step S8, at step S9, control input determination section 4c of microcomputer 4 computes the current target vehicle data $x_p^0$, the host vehicle speed $v_0$, and the target vehicle speed $v_c$, and computes the control input commands for the throttle and brake actuators. Subsequent to step S9, at step S10, microcomputer 4 sends the control input commands to throttle controller 7 and to brake controller 10, and the routine returns.

The inter-vehicle distance control is implemented by repeatedly executing the above-mentioned data processing routine. In contrast to conventional inter-vehicle distance control device, the vehicle operation support apparatus is configured to have a function of selecting a current target vehicle in such a manner that the host vehicle is predicted to realize the most desirable operation in accordance with an environmental situation, without selecting the current target vehicle only based on the spatial relationship of vehicles concerned. The processing of vehicle operation plan determination section 4a serves for this advantageous function. FIG. 5 is a functional block diagram of vehicle operation plan determination section 4a. As shown in FIG. 5, vehicle operation plan determination section 4a includes three operation parts, i.e. vehicle group behavior prediction operation part 4a-1, predicted-behavior evaluation operation part 4a-5, and vehicle operation plan generation operation part 4a-6.

Vehicle operation plan generation operation part 4a-6 is configured to generate a candidate value of the operation plan including the target vehicle identifier $i(\tau)$ and the target lane position $y(\tau)$ over the prediction horizon from a current instant t to a future instant t+T. In this embodiment, the prediction horizon is divided into N steps to deal with discrete data for digital computation. Specifically, a time series of the target vehicle identifier $i(\tau)$ and a time series of the target lane position $y(\tau)$ over the prediction horizon are described in a discrete time form by the following equations (6) and (7).

$$I_N = \left(i(t)i\left(t+\frac{T}{N}\right)\cdots i\left(t+\frac{N-1}{N}T\right)\right) \quad (6)$$

$$Y_N = \left(y(t)y\left(t+\frac{T}{N}\right)\cdots y\left(t+\frac{N-1}{N}T\right)\right) \quad (7)$$

The generated candidate value of the vehicle operation plan $(I_N, Y_N)$ are sent to vehicle group behavior prediction operation part 4a-1.

Vehicle group behavior prediction operation part 4a-1 is configured to predict a future dynamic behavior or movement of a vehicle group including the host vehicle and detected neighboring vehicles that is controlled in accordance with the generated candidate value of the vehicle operation plan $I_N$ and $Y_N$. A time series of a state of a vehicle group as a prediction result of the processing of vehicle group behavior prediction operation part 4a-1 is described by the following equation (8).

$$X(I_N, Y_N) = \left(x(t)x\left(t+\frac{T}{N}\right)\cdots x\left(t+\frac{N-1}{N}T\right)\right) \quad (8)$$

where $x(\tau)$ is a vector including the longitudinal position, the vehicle speed, and the lateral position, of each of the host vehicle and the detected neighboring vehicles at a future instant $\tau$ within the prediction horizon. In the situation of FIG. 4, the state $x(\tau)$ is described by the following equation (9).

$$x(\tau) = (x_0(\tau)v_0(\tau)y_0(\tau)x_1(\tau)\ldots y_3(\tau))^T \quad (9)$$

Specific computation of the predicted value is performed by three operation blocks of vehicle group behavior prediction operation part 4a-1, i.e. vehicle speed control logic operation part 4a-2, host vehicle behavior prediction operation part 4a-3, and detected-vehicle behavior prediction operation part 4a-4.

Vehicle speed control logic operation part 4a-2 is configured to provide a normative value of a time series of a control input to the host vehicle over a control horizon of time in accordance with a candidate value of the vehicle operation plan. In this embodiment, vehicle speed control logic operation part 4a-2 includes the same algorithm as control input determination section 4c. In vehicle speed control logic operation part 4a-2, however, the target vehicle is specified by $I_N$, and the command value computed here is used not for actual control but for prediction. Since the system model is time discrete in the prediction, the algorithm of the equation (3) is described by the following equation (10).

$$\hat{x}_{ACC}(j+1) = \hat{x}_{ACC}(j) + \left(A(\hat{\theta})\hat{x}_{ACC}(j) + B(\hat{\theta})\begin{pmatrix}\hat{x}_p(j)\\ \hat{v}_0(j)\end{pmatrix}\right)\cdot\frac{T}{N} \quad (10)$$

$$\hat{v}(j) = C(\hat{\theta})\hat{x}_{ACC}(j)$$

$$\hat{x}_p(j) = (x_{i(j)}(j) - x_0(j)v_{i(j)} - v_0(j)v_{i(j)}(j))^T \quad (11)$$

$$\hat{\theta} = (\hat{x}_p(j)\hat{v}_0(j)v_0^*)^T \quad (12)$$

where each variable with an index (j) represents a value at a j-th time-discrete step of the prediction horizon, or at $\tau=t+(T/N)j$. ^ is introduced in order to distinguish the computation in vehicle speed control logic operation part 4a-2 from that in control input determination section 4c.

Host vehicle behavior prediction operation part 4a-3 is configured to predict a future dynamic behavior of the host vehicle. The longitudinal movement of the host vehicle is predicted based on the output of vehicle speed control logic operation part 4a-2, assuming that the speed control of the equation (5) is completely realized. The predicted longitudinal movement of the host vehicle is modeled and described by the following equations (13) and (14).

$$x_0(j+1) = x_0(j) + v_0(j)\cdot\frac{T}{N} \quad (13)$$

-continued $$v_0(j+1) = v_0(j) + (-\omega_v v_0(j) + \omega_v v_c(j)) \cdot \frac{T}{N} \quad (14)$$

On the other hand, the lateral movement of the host vehicle is modeled and predicted based on given $Y_N$ using the following equation (15).

$$y_0(j+1) = y_0(j) + (-\omega_Y y_0(j) + \omega_Y y(j)) \cdot \frac{T}{N} \quad (15)$$

Detected-vehicle behavior prediction operation part 4a-4 is configured to predict a future dynamic behavior of each detected neighboring vehicle. In this embodiment, detected-vehicle behavior prediction operation part 4a-4 is constructed to deal with the longitudinal movement, assuming that neighboring vehicles do not perform lane change. The prediction is implemented by using a model of follow-up performance obtained by modeling human operation concerning the vehicle longitudinal movement. The dynamic behavior of a vehicle assigned with ID number k is modeled by the following equations (16) through (18).

$\dot{x}_k = v_k$ $\dot{v}_k = f(x_p^k)$ $\dot{y}k = 0 \quad (16)$ $x_p^k = (x_p^k - x_k, v_p^k - v_k)^T \quad (17)$ $f(x_p^k) = K_1(x_p^k - x_k - h_k v_k) + K_2(v_p^k - v_k)$ (in case vehicle k has a preceding vehicle)

$f(x_p^k) = K_v(v_k^* - v_k) \quad (18)$ (in case vehicle k has no preceding vehicle)

where $x_p^k$, and $v_p^k$ are the position and the vehicle speed of a vehicle preceding vehicle k in the same lane, $v_k^*$ is an estimated desired speed of vehicle k, $h_k$ is an estimated desired inter-vehicle time of vehicle k, and $K_1$, $K_2$, and $K_v$ are parameters as determinants for characteristics of follow-up performance. With the spatial relationship between the vehicles concerned, $x_p^k$, and $v_p^k$ are uniquely determined. For example, in the situation of FIG. 4, neighboring vehicle A is the preceding vehicle of neighboring vehicle B. Accordingly, it is set that $x_p^2 = x_1$ and $v_p^2 = v_1$. On the other hand, the lateral movement is described by $\dot{y}_k = 0$, assuming that neighboring vehicles do not perform lane change. With the above-mentioned models, the movement of neighboring vehicle k is predicted using the following time-discrete equations (19) through (21) like the equations (13) through (15).

$$x_k(j+1) = x_k(j) + v_k(j) \cdot \frac{T}{N} \quad (19)$$

$$v_k(j+1) = v_k(j) + f(x_p^k(j)) \cdot \frac{T}{N} \quad (20)$$

$$y_k(j+1) = y_k(j) \quad (21)$$

Thus, detected-vehicle behavior prediction operation part 4a-4 computes $X(I_N, Y_N)$ that is a movement prediction result of the whole vehicle group in case the host vehicle is controlled in accordance with a given operation plan $I_N$ and $Y_N$. $X(I_N, Y_N)$ is output to predicted-behavior evaluation operation part 4a-5.

Detected-behavior evaluation operation part 4a-5 is configured to perform an evaluation operation of providing a quantitative measure in accordance with the predicted value of the time series vehicle group state. Specifically, detected-behavior evaluation operation part 4a-5 is configured to evaluate numerically the movement predicted by vehicle group behavior prediction operation part 4a-1, in accordance with predetermined criteria for determining a degree of desirability of the prediction result. In this embodiment, an evaluation function is constructed by the following equation (22) to evaluate the vehicle operation plan $I_N$, $Y_N$.

$$J(I_N, Y_N) = \overline{J}(X(I_N, Y_N), I_N, Y_N) = \sum_{j=0}^{N-1} L(x(j), i(j), y(j)) \quad (22)$$

where L(x,i,y) is an evaluation function indicative of a degree of desirability of the instantaneous state of the vehicle group. In this embodiment, the evaluation function L is constructed to decrease with increasing degree of desirability. For example, in order to express a request of keeping the vehicle speed near or at the set vehicle speed, the evaluation function L is constructed including the following evaluation function (23).

$$L_v = (v_0 - v_0^*)^2 \quad (23)$$

In order to express a request of keeping the host vehicle away form vehicle k, the evaluation function L is constructed including the following evaluation function (24).

$$L_k = \frac{1 + y_0 y_k}{2} \cdot \frac{1}{(x_k - x_0)^2} \quad (24)$$

The equation (24) is to evaluate the inter-vehicle distance between the host vehicle and each detected vehicle, so that $L_k$ decreases with increasing inter-vehicle distance when vehicle k is present in the same lane as the host vehicle. When vehicle k is not present in the same lane as the host vehicle, $L_k$ is calculated to be zero independently of the inter-vehicle distance.

When operation of direction indicator switch 6 is detected, the evaluation function L may include a term for evaluating the lane position of the host vehicle in accordance with the driver's intention of lane change. In this embodiment, the evaluation function L includes the following evaluation function (25).

$L_y = -y_0$ (in case left turn intended)

$L_y = 0$ (in case no turn intended)

$L_y = y_0$ (in case right turn intended) $\quad (25)$

The whole evaluation equation is constructed to be a weighted sum of the above-mentioned evaluation terms, in order to balance the evaluation terms. Specifically, the instantaneous evaluation function is described by the following equation (26).

$$L = w_v L_v + w_y L_y + \sum_{k=1}^{K} w_k L_k \quad (26)$$

where $w_v$, $w_y$, and $w_k$ are parameters each indicative of a weighting of the corresponding evaluation term in the evaluation function, and K is the number of detected vehicles (K=3 in the situation of FIG. 4).

Thus, the evaluation function is provided to calculate an evaluation value J based on a candidate value of the vehicle operation plan ($I_N$, $Y_N$). Accordingly, by iterations of generation of candidate value of the vehicle operation plan and calculation of its evaluation value, vehicle operation plan generation operation part 4a-6 finds an optimal value of the vehicle operation plan. i(τ) can take values of the ID number of each detected neighboring vehicle, and 0 indicative of absence of the target vehicle. Accordingly, $I_N$ can take a limited number of patterns. In the situation of FIG. 4, the number of vehicle plan patterns of $I_N$ is $4^N$. On the other hand, y(τ) can take two values of 1 for the left lane and −1 for the right lane. Accordingly, the number of vehicle plan patterns of $Y_N$ is $2^N$. Hence, in the situation of FIG. 4, the number of elements of the vehicle operation plan is $4^N \cdot 2^N = 8^N$. Theoretically, the optimal value of the vehicle operation plan is found by investigating all the patterns of the vehicle operation plan. However, in $8^N$ patterns of the vehicle operation plan, there is included impermissible patterns indicative of undue repeated lane change, and meaningless patterns that a vehicle following the host vehicle is selected as a target vehicle. Accordingly, in order to perform effective search of solution, the search space is suitably limited. For example, switch of the target vehicle and switch of the target lane may be each limited at once within the prediction horizon. With this limitation of the search space in the case of FIG. 4, the total of patterns to be searched decreases to $(3N+1) \cdot (N+1) = 3N^2 + 4N+1$. It is possible that the solution obtained by limiting the search space is not the optimal solution. However, in many cases, it is expectable that the solution provides a rational vehicle operation plan. Thus, vehicle operation plan generation operation part (4a-6) is configured to generate the vehicle operation plan ($I_N$, $Y_N$) by optimization based on the evaluation operation. As discussed above, vehicle operation plan generation operation part 4a-6 has the algorithm of repeating generation and evaluation of the vehicle operation plan and outputting the optimal value of the vehicle operation plan that is evaluated to provide the best evaluation value, as an operation result of vehicle operation plan determination section 4a.

Figure 8:
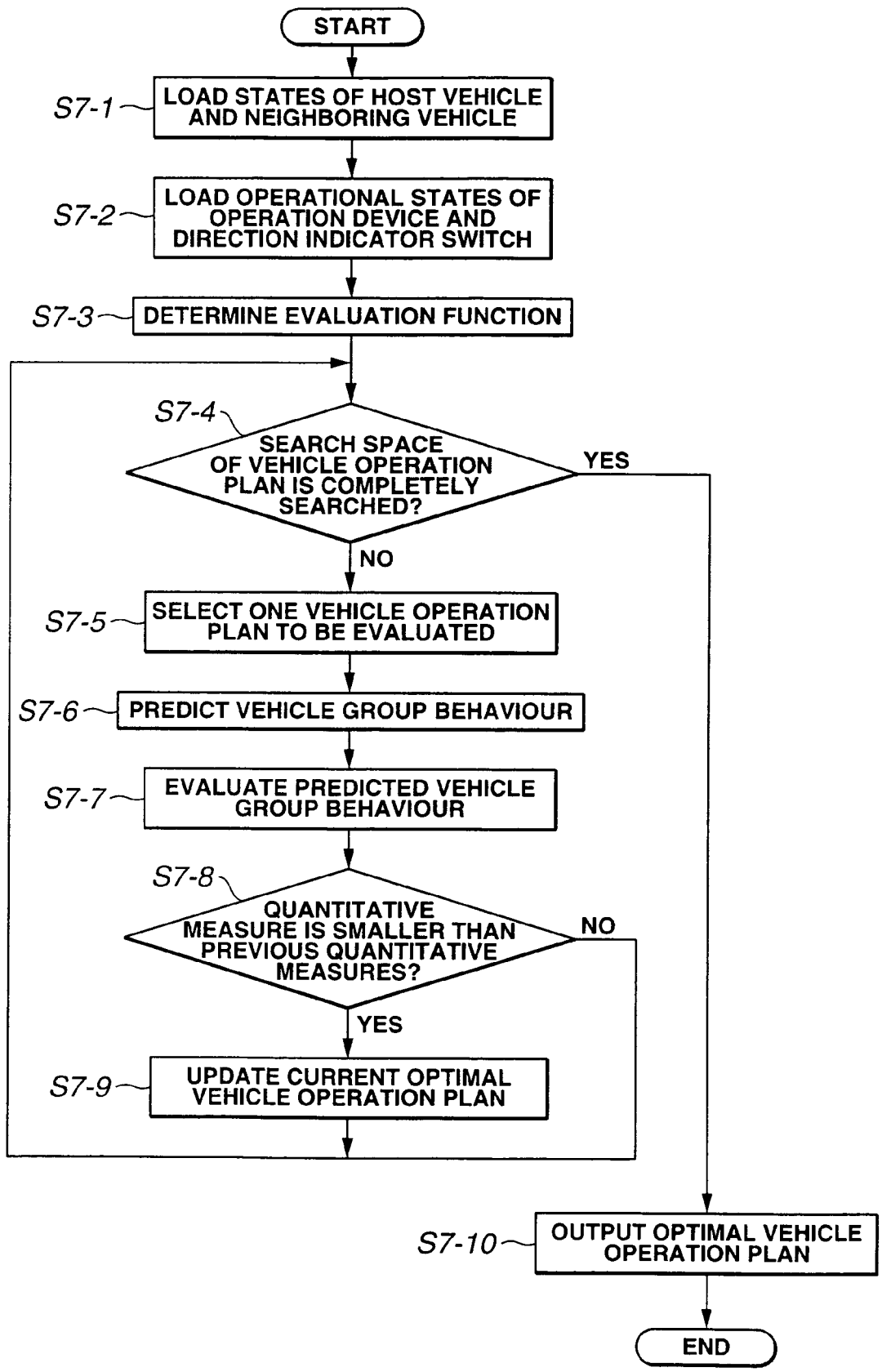
FIG. 8 is a flow chart depicting a routine to be executed by the vehicle operation plan determination section of the vehicle operation support apparatus of FIG. 1.

FIG. 8 is a flow chart depicting the above-mentioned algorithm of vehicle operation plan determination section 4a, which is the detailed construction of step S7 in FIG. 7. First, at step S7-1, microcomputer 4 reads detection data x(f) on the host vehicle and neighboring vehicles. x(f) is used as an initial value of later movement prediction operation. Subsequent to step S7-1, at step S7-2, microcomputer 4 loads the signals of the set vehicle speed and the operational state of direction indicator switch 6. Subsequent to step S7-2, at step S7-3, microcomputer 4 constructs the evaluation functions (26) and (22) based on the loaded information. Subsequent to step S7-3, at step S7-4, microcomputer 4 determines whether or not the target search space of the vehicle operation plan is completely searched. The search operation of vehicle operation plan generation operation part 4a-6 is started at step S7-4. Subsequent to step S7-4, at step S7-5, microcomputer 4 selects one vehicle operation plan $I_N$, $Y_N$ to be evaluated.

Subsequent to step S7-5, at step S7-6, microcomputer 4 perform movement prediction of the vehicle group behavior including the host vehicle and neighboring vehicles based on the initial value set at step S7-1 using the equations (10) through (21). Subsequent to step S7-6, at step S7-7, microcomputer 4 computes the evaluation value of the selected vehicle operation plan using the predicted vehicle group behavior computed at step S7-6 and the evaluation function provided at step S7-3. Subsequent to step S7-7, at step S7-8, microcomputer 4 compares the evaluation value computed at step S7-7 with the evaluation value of the provisional optimal vehicle operation plan (the smallest among the evaluation values of the investigated vehicle operation plans). When the computed evaluation value is smaller, microcomputer 4 updates the optimal vehicle operation plan at step S7-9. On the other hand, when the computed evaluation value is not smaller, the routine returns to step S7-4, without performing renewal of the optimal vehicle operation plan.

When the optimal vehicle operation plan is not defined (at the first-time search operation), the pending vehicle operation plan is unconditionally adopted as an optimal vehicle operation plan. After the update process is completed in any case, the routine returns to step S7-4. If there is non-searched vehicle operation plans within the search space, microcomputer 4 continues to search. On the other hand, if all the candidates of the vehicle operation plan are investigated, the routine proceeds to step S7-10, where microcomputer 4 outputs the optimal vehicle operation plan. Subsequently, the operation is completed.

FIGS. 9A through 11D are views illustrating a sample case in which the vehicle operation support apparatus operates.

In a first situation shown in FIG. 9A, host vehicle M is traveling in the left lane with the set vehicle speed of the vehicle operation support apparatus being set to 100 km/h, and neighboring vehicle A is traveling in the right lane immediately behind host vehicle M at almost the same speed (100 km/h). In this situation, it is newly detected that vehicle B is traveling in the left lane at a speed of 85 km/h ahead of host vehicle M. If host vehicle M starts to follow vehicle B, host vehicle M first needs to speed down below the set vehicle speed. On the other hand, it is difficult to perform lane change to the right lane since vehicle A is present in the right lane. Accordingly, as shown in FIGS. 9B and 9C, vehicle operation plan determination section 4a generates a vehicle operation plan indicating that host vehicle M follows vehicle B in the left lane. In accordance with the generated vehicle operation plan, host vehicle M starts the inter-vehicle distance control with respect to neighboring vehicle B, to speed down gently to 85 km/h which is the driving speed of neighboring vehicle B.

FIG. 10A shows a second situation where vehicle C is newly detected behind vehicle A in the slowdown of host vehicle M, and direction indicator switch 6 is operated to be indicative of rightward lane change when or after host vehicle M is passed by vehicle A. As shown in FIGS. 10B and 10C, at this moment, vehicle operation plan determination section 4a generates a vehicle operation plan indicative of continuing the follow-up run to neighboring vehicle B for some time, changing the planned target vehicle from vehicle B to vehicle A, starting acceleration, and starting a lane change to the right lane. Although the vehicle operation plan indicates a future change of the target vehicle and a future change of the target lane, the present target vehicle is still vehicle B. Accordingly, the vehicle operation support apparatus continues the follow-up run to neighboring vehicle B.

FIG. 11A shows a third situation after time has further elapsed from the second situation of FIG. 10A, where the distance to neighboring vehicle A increases to be large. At this moment, vehicle operation plan determination section 4a generates a vehicle operation plan indicative of immediately switching the target vehicle to vehicle A, and changing the target lane to the right lane after that. Since neighboring vehicle A is selected as the current target vehicle at this moment, acceleration of host vehicle M is started immediately.

Published Japanese Patent Application No. 2000-135934 shows an inter-vehicle distance control device configured to start acceleration after changing lanes. With this conventional inter-vehicle distance control device, in the situation where another neighboring vehicle C are approaching from back as shown in FIG. 11A, a driver may feel sense of incongruity for operation of starting a lane change without acceleration. In contrast, in the situation of FIG. 11A, when the distance to neighboring vehicle A increases to be large, the vehicle operation support apparatus of the shown embodiment changes the target vehicle to neighboring vehicle A, and speeds up host vehicle M, and performs lane change to the right lane after that. Accordingly, natural operation can be realized so that a driver does not feel sense of incongruity.

The vehicle operation support apparatus of this embodiment may be modified as follows. Detected-vehicle behavior prediction operation part 4a-4 is configured to predict a future time series of a longitudinal position and a lateral position of each detected vehicle over the prediction horizon, and target vehicle determination section 4b is configured to set the current target vehicle to one of an immediately previous target vehicle and a vehicle predicted to cut in on the host vehicle, when the driver's intention of lane change is absent. On the other hand, predicted-behavior evaluation operation part 4a-5 is configured to more highly evaluate a predicted value of the time series vehicle group state including a lane change in accordance with the driver's intention than a predicted value of the time series vehicle group state including no lane change in accordance with the driver's intention, when the driver's intention of lane change is present.

The vehicle operation support apparatus configured to select a target vehicle in accordance with a vehicle operation plan, is effective for performing a switch of preceding vehicle suitable for an environmental situation, and rationalizing the timing of actually starting the operation including a lane change. Therefore, the vehicle operation support apparatus contributes to reducing a driver load of determination and operation at the time of lane change.

The vehicle operation support apparatus configured to assume and predict not only changes of the target vehicle due to the lane change of the host vehicle but also changes of the target vehicle due to cutting-in of a neighboring vehicle, and to switch the target vehicle to the cutting-in vehicle in accordance with the prediction before the actual cutting-in, is effective for responding with a safety margin to cutting-in of a neighboring vehicle.

The vehicle operation support apparatus configured to include a lane change intention detection section as an input device for clearly detecting a driver's intention of a lane change, and to control lane change operation in accordance with the driver's intention of lane change, is effective for performing an operation support reflecting the driver's intention more faithfully.

The vehicle operation support apparatus or method includes the predicted behavior evaluation operation part configured to estimate numerically the result of movement prediction of the host vehicle and neighboring vehicles. The predicted-behavior evaluation operation part uses an evaluation function including a plurality of evaluation criteria. Accordingly, the predicted-behavior evaluation operation part obtains a vehicle operation plan in consideration of trade-off between constraints due to neighboring vehicles and a desired running state of the host vehicle. Thus, the vehicle operation support apparatus generates an operation target suitable for environmental situation around the host vehicle.

The generated vehicle operation plan serves for supporting determination of driver's operation action, or serves as a reference signal for a device for controlling vehicle's movement to support driver's operation so that the device operates in accordance with an environmental situation.

The vehicle operation plan determination section configured to include a vehicle speed control logic operation part simulating a desired characteristic of longitudinal movement of the host vehicle, is effective for reducing a driver load of tuning for generating a vehicle operation plan with little sense of incongruity for a driver.

The predicted-behavior evaluation operation part configured to adjust the evaluation criteria in accordance with driver's indicated intention of lane change, is effective for deriving an optimal vehicle operation plan that is produced by highly evaluating a lane change along the driver's intention, and thereby for performing operation support more faithfully along the driver's intention.

Figure 12:
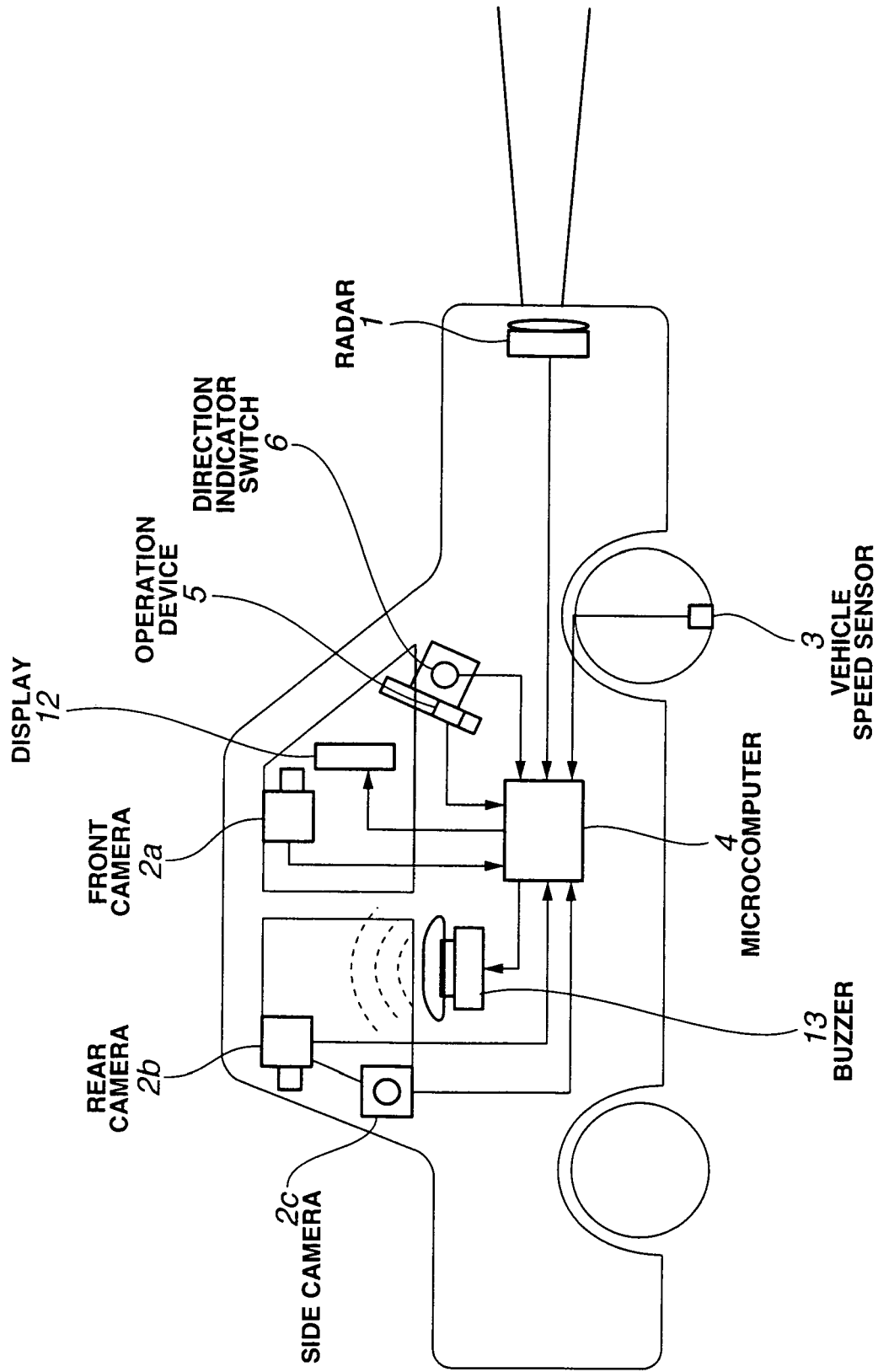
FIG. 12 is a schematic diagram depicting an automotive vehicle equipped with a vehicle operation support apparatus in accordance with a second embodiment.

Referring now to FIGS. 12 through 17D, there is shown an operation support apparatus for an automotive vehicle in accordance with a second embodiment. FIG. 12 is a schematic diagram depicting an automotive vehicle equipped with an operation support apparatus in accordance with the second embodiment. As shown in FIG. 12, the operation support apparatus basically includes the same components as the vehicle operation support apparatus of the first embodiment shown in FIG. 1. However, the operation support apparatus of this embodiment does not include controllers 7 and 10, and actuators 8 and 11, but include a display 12, and a buzzer 13. Cameras 2a, 2b, and 2c are configured to monitor or detect the lighting state of direction indicators of each neighboring vehicle in addition to its position.

Disposed within the host vehicle, display 12 includes an LCD (liquid crystal display) panel configured to display support information sent from microcomputer 4. Disposed within the host vehicle, buzzer 13 is configured to generate sound to call a driver's attention in accordance with instructions from microcomputer 4.

Figure 13:
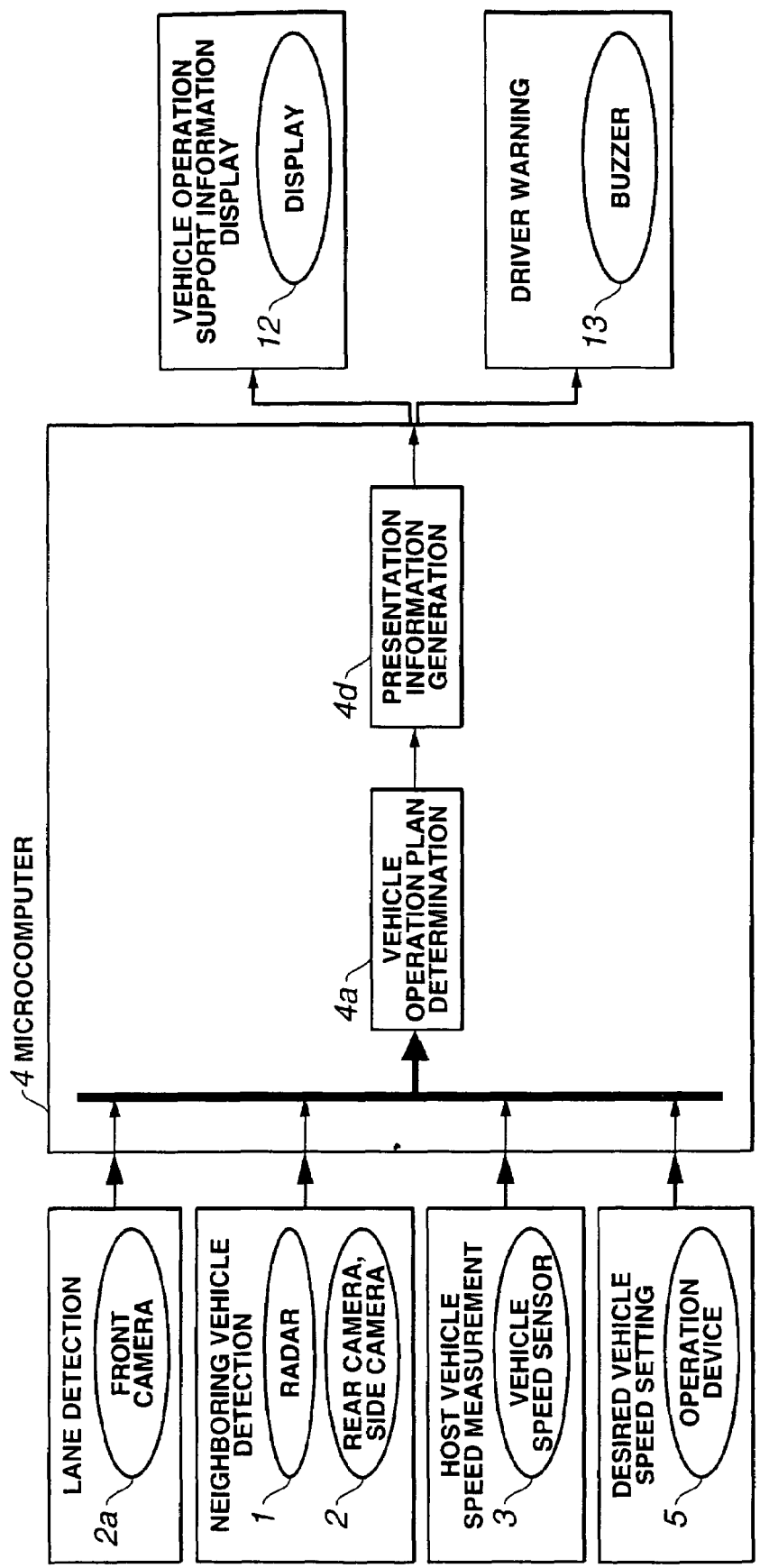
FIG. 13 is a functional block diagram of the vehicle operation support apparatus of FIG. 12.

FIG. 13 is a functional block diagram of microcomputer 4. As shown in FIG. 13, microcomputer 4 includes vehicle operation plan determination section 4a as in the first embodiment, and a presentation information generation section 4d configured to convert the generated optimal vehicle operation plan into the information to be presented to a driver.

Although vehicle operation plan determination section 4a is configured basically as in the first embodiment as shown in FIG. 5, vehicle operation plan determination section 4a of this embodiment is also configured to predict lane change of each detected neighboring vehicle. Accordingly, detected-vehicle behavior prediction operation part 4a-4 is configured to perform the processing of predicting transverse direction movement of each detected neighboring vehicle. Specifically, the equation (21) in the first embodiment is replaced by the following equation (27).

$$y_k(j+1) = y_k(j) + (-\omega_Y y_k(j) + \omega_Y y_k^*(j)) \cdot \frac{T}{N} \qquad (27)$$

where $y_k^*(j)$ is an estimated target lane position of neighboring vehicle k. When the lightning of the direction indicators of vehicle k is not detected, the estimated target lane position is set to the current detected lane position of neighboring vehicle k. When the lightning of the direction indicators of vehicle k is detected, $y_k^*(j)$ is set to the value corresponding to the lane indicated with the direction indicators of vehicle k when the following conditions (28) and (29) are satisfied as to all the vehicles concerned (including the host vehicle and neighboring vehicles) that are running in the indicated lane. On the other hand, when the conditions (28) and (29) are unsatisfied, $y_k^*(j)$ is set to the same value as $y_k(j)$, which means prediction of remaining in the present lane position.

$$|x_l(j) - x_k(j)| \geq R_0 \qquad (28)$$

$$\begin{cases} v_l(j) - v_k(j) \geq R_{d0} \cdots x_l(j) \geq x_k(j) \\ v_k(j) - v_l(j) \geq R_{d0} \cdots x_l(j) \leq x_k(j) \end{cases} \qquad (29)$$

where $R_0$ and $R_{d0}$ are positive parameters indicative of threshold values of inter-vehicle distance and relative speed, respectively, and used to determine whether or not vehicle k performs a lane change. The subscript l is substituted with the registered ID numbers of all the vehicles that are present in the indicated lane. Thus, vehicle operation plan determination section 4a is configured to determine the planned target vehicle by checking a vehicle predicted to cut in on the host vehicle.

Presentation information generation section 4d shows information to a driver in accordance with the vehicle operation plan generated by vehicle operation plan determination section 4a. Specifically, first, presentation information generation section 4d investigates $I_N$ to check whether or not there is a change in the selection of the target vehicle. When there is a change in the selection of the target vehicle, presentation information generation section 4d investigates which vehicle is a future target vehicle. When the direction indicators of the vehicle indicates lane change into the lane that the host vehicle driving, meaning that there is possibility that a neighboring vehicle may cut in front of the host vehicle, presentation information generation section 4d sends the command signal to buzzer 13 to sound. Presentation information generation section 4d calls vehicle speed control logic operation part 4a-2 to compute a target speed of the host vehicle for the inter-vehicle distance control whose target vehicle is the vehicle corresponding to i(f) as a head ingredient of $I_N$, and to compare the target vehicle speed with the current host vehicle speed. When the current host vehicle speed is higher than the target vehicle speed, presentation information generation section 4d sends the signal indicative of recommending a speed down to display 12 to display the corresponding visual information and inform the driver of the recommendation. On the other hand, when the current vehicle speed is lower than the target vehicle speed, presentation information generation section 4d sends the signal indicative of recommending a speed up to display 12 to display the corresponding visual information and inform the driver of the recommendation.

Presentation information generation section 4d is also configured to investigate $Y_N$ to check whether or not the generated vehicle operation plan includes a change in the target lane position. When there is a change in the target lane position, presentation information generation section 4d sends a signal indicative of recommending a lane change to display 12.

Figure 14:
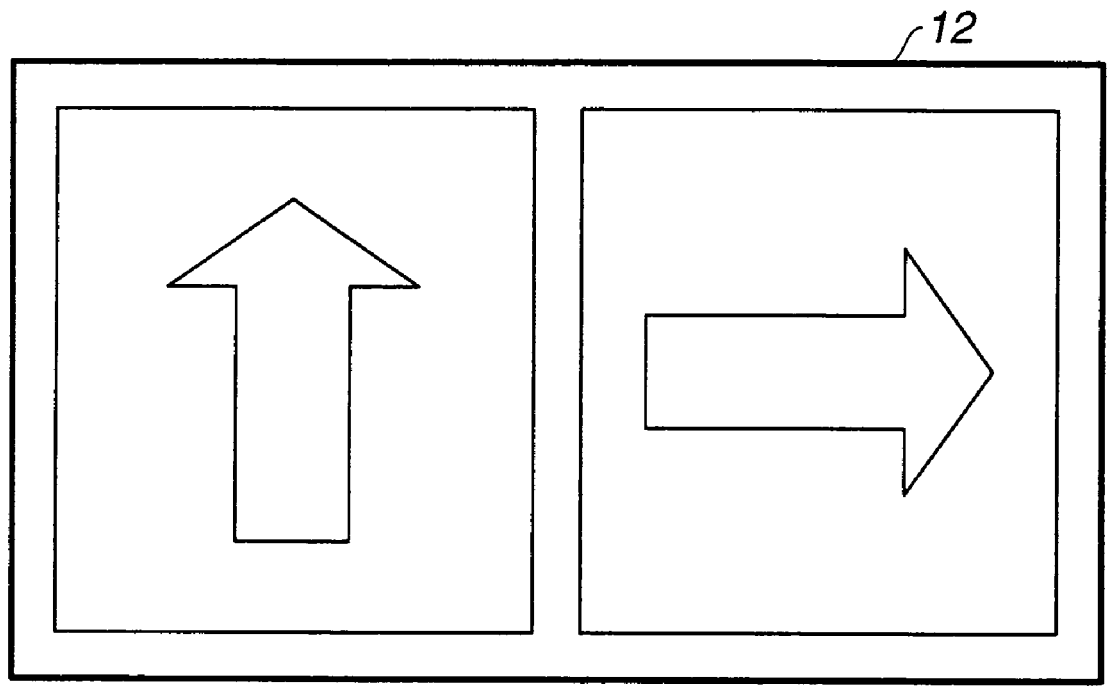
FIG. 14 is a view illustrating a sample output produced by a display of the vehicle operation support apparatus of FIG. 12.

FIG. 14 is a view illustrating a sample output produced by display 12 of the vehicle operation support apparatus of FIG. 12. The information of recommended operation of acceleration/deceleration and the information of recommended operation of lane change are displayed in the form of a vertical arrow on the left side, and in the form of a horizontal arrow on the right side, respectively.

As discussed above, display 12 serves as a display section configured to present a recommended vehicle operation of the host vehicle in accordance with the vehicle operation plan, the recommended vehicle operation including a recommended longitudinal acceleration of the host vehicle and a recommended lane selection of the host vehicle. buzzer 13 serves as a warning section configured to generate a warning signal when the vehicle operation plan includes a change in one of the selection of the planned target vehicle and the selection of the planned target lane position within the prediction horizon.

FIGS. 15A through 17D are views illustrating a sample case in which the operation support apparatus operates.

FIGS. 15A through 15D show a first situation where host vehicle M and neighboring vehicle A is traveling in the left lane, and neighboring vehicle B is traveling in the right lane. In this situation, host vehicle M gradually speeds up to reduce the inter-vehicle distance to neighboring vehicle A.

FIG. 16A shows a second situation where neighboring vehicle B operates the direction indicators leftward to announce a lane change beforehand. At this time, vehicle operation plan determination section 4a generates a vehicle operation plan indicative of a switch of the planned target vehicle to neighboring vehicle B, based on detection of cutting-in of neighboring vehicle B, as shown in FIGS. 16B and 16C. In accordance with the vehicle operation plan, buzzer 13 sounds to call driver's attention, and display 12 displays information of recommending a speed down in order to prepare for the cutting-in of neighboring vehicle B, as shown in FIG. 16D.

FIG. 17A shows a third situation where neighboring vehicle B completes a lane change so that there is no vehicle traveling in the right lane. Vehicle operation plan determination section 4a generates a vehicle operation plan that cancels the selection of vehicle B as the target vehicle (the control mode shifts to the speed control to a set vehicle speed), and performs lane change to the is right lane, as shown in FIGS. 17B and 17C. Display 12 draws visual information to a driver, based on a signal indicative of a lane change to the right lane, as shown in FIG. 17D.

As mentioned above, the operation support apparatus of this embodiment configured to include display 12 for displaying the information on the vehicle operation plan generated with vehicle operation plan determination section 4a, is effective for recommending a suitable operation to a driver in consideration of an environmental situation to support driver's operation.

The operation support apparatus or method of the shown embodiment configured to simplify the generated vehicle operation plan, and to show a specific and simplified operation to a driver, is effective for informing the driver of the device-recommended operation in an intuitively understandable form.

The operation support apparatus or method of the shown embodiment configured to detect beforehand based on movement prediction a situation where driver's attention needs to be higher than in usual follow-up running, such as a situation of a lane change of the host vehicle and a cutting-in of a neighboring vehicle, and to show the detection result to a driver, is effective for calling a driver's attention in an early stage, and for supporting operation with a safety margin.

This application is based on a prior Japanese Patent Application No. 2004-316098 filed on Oct. 29, 2004. The entire contents of this Japanese Patent Application No. 2004-316098 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicle operation support apparatus comprising:
    an input section including:
        a vehicle detection section configured to detect a vehicle present on a road where a host vehicle is present; and
        a lane detection section configured to detect a lane of the road; and
    a control unit connected to the input section and configured to receive information obtained by the input section, the control unit including:
        a vehicle operation plan determination section configured to determine a vehicle operation plan including a future time series of a selected planned target vehicle and a future time series of a selected planned target lane position over a first predetermined period of time;
        the vehicle operation plan determination section including:
            a vehicle group behavior prediction operation part configured to predict a future time series of a position set of a vehicle group over the first predetermined period according to a value of the vehicle operation plan, wherein the vehicle group includes the host vehicle and at least one neighboring detected vehicle;
            a predicted-behavior evaluation operation part configured to calculate a predetermined evaluation function of the predicted future time series of the position set of the vehicle group; and
            a vehicle operation plan generation operation part configured to select one vehicle operation plan with reference to calculated values of the predetermined evaluation function,
        the vehicle group behavior prediction operation part including:
            a vehicle speed control logic operation part configured to provide a normative value of a time series of a control input to the host vehicle over a second predetermined period of time in accordance with the value of the vehicle operation plan;
            a host vehicle behavior prediction operation part configured to predict a time series of a position of the host vehicle over the first predetermined period in accordance with the normative value of the time series of the control input and the value of the vehicle operation plan; and
            a detected neighboring vehicle behavior prediction operation part configured to predict a future time series of a position of the at least one neighboring detected vehicle over the first predetermined period,
        wherein the vehicle operation support apparatus further comprises an output section configured to regulate the control input in accordance with a control input command and connected to the control unit for receiving the control input command, wherein the control unit includes:
            a target vehicle determination section configured to select a current target vehicle in accordance with the vehicle operation plan; and
            a control input determination section configured to set the control input command to a normative value of the control input in accordance with the selection of the current target vehicle,
        wherein the control input includes a longitudinal acceleration of the host vehicle, wherein the control input determination section is configured to set a longitudinal acceleration command to a normative value of the longitudinal acceleration in accordance with the selection of the current target vehicle, and wherein the output section is configured to regulate the longitudinal acceleration by adjusting a wheel torque of the host vehicle in accordance with the longitudinal acceleration command.

2. The vehicle operation support apparatus as claimed in claim 1, wherein the input section includes:
    a host vehicle speed measurement section configured to measure a vehicle speed of the host vehicle; and
    a desired vehicle speed setting section configured to set a desired vehicle speed of the host vehicle, and
    wherein the control input determination section is configured to set the control input command so as to provide a desired inter-vehicle distance between the host vehicle and the current target vehicle when the current target vehicle is present, and to set the control input command so as to adjust the vehicle speed to the desired vehicle speed when the current target vehicle is absent.

3. The vehicle operation support apparatus as claimed in claim 1, wherein the target vehicle determination section is configured to determine the current target vehicle to be identical to a current selected planned target vehicle in accordance with the vehicle operation plan.

4. The vehicle operation support apparatus as claimed in claim 1, wherein the input section includes:
    a host vehicle speed measurement section configured to measure a vehicle speed of the host vehicle; and
    a desired vehicle speed setting section configured to set a desired vehicle speed of the host vehicle, and
    wherein the vehicle speed control logic operation part is configured to set the normative value of the control input so as to control an inter-vehicle distance between the host vehicle and the planned target vehicle when the planned target vehicle is present, and to set the normative value of the control input so as to adjust the vehicle speed to the desired vehicle speed when the planned target vehicle is absent.

5. The vehicle operation support apparatus as claimed in claim 1, wherein the position of the host vehicle includes a longitudinal position and a lateral position of the host vehicle, and wherein the position of each neighboring detected vehicle includes a longitudinal position of the neighboring detected vehicle.

6. The vehicle operation support apparatus as claimed in claim 1, wherein the detected neighboring vehicle behavior prediction operation part is configured to predict a future time series of a longitudinal position and a lateral position of each neighboring detected vehicle over the first predetermined period, and wherein the vehicle operation plan determination section is configured to determine the planned target vehicle by checking a vehicle predicted to move in front of or move into a path preceding the host vehicle.

7. A vehicle operation support apparatus comprising:
an input section including:
a vehicle detection section configured to detect a vehicle present on a road where a host vehicle is present; and
a lane detection section configured to detect a lane of the road; and
a control unit connected to the input section and configured to receive information obtained by the input section, the control unit including:
a vehicle operation plan determination section configured to determine a vehicle operation plan including a future time series of a selected planned target vehicle and a future time series of a selected planned target lane position over a first predetermined period of time;
the vehicle operation plan determination section including:
a vehicle group behavior prediction operation part configured to predict a future time series of a position set of a vehicle group over the first predetermined period according to a value of the vehicle operation plan, wherein the vehicle group includes the host vehicle and at least one neighboring detected vehicle;
a predicted-behavior evaluation operation part configured to calculate a predetermined evaluation function of the predicted future time series of the position set of the vehicle group; and
a vehicle operation plan generation operation part configured to select one vehicle operation plan with reference to calculated values of the predetermined evaluation function,
the vehicle group behavior prediction operation part including:
a vehicle speed control logic operation part configured to provide a normative value of a time series of a control input to the host vehicle over a second predetermined period of time in accordance with the value of the vehicle operation plan;
a host vehicle behavior prediction operation part configured to predict a time series of a position of the host vehicle over the first predetermined period in accordance with the normative value of the time series of the control input and the value of the vehicle operation plan; and
a detected neighboring vehicle behavior prediction operation part configured to predict a future time series of a position of the at least one neighboring detected vehicle over the first predetermined period,
wherein the vehicle operation support apparatus further comprises a display section configured to present a recommended vehicle operation of the host vehicle in accordance with the vehicle operation plan,
wherein the recommended vehicle operation includes a recommended longitudinal acceleration of the host vehicle and a recommended lane selection of the host vehicle.

8. The vehicle operation support apparatus as claimed in claim 7, further comprising a warning section configured to generate a warning signal when the vehicle operation plan includes a change in one of the selected planned target vehicle and the selected planned target lane position within the first predetermined period.

9. A vehicle operation support method comprising:
an input operation including:
a vehicle detection operation of detecting a vehicle present on a road where a host vehicle is present; and
a lane detection operation of detecting a lane of the road; and
a control operation including:
a vehicle operation plan determination operation of determining a vehicle operation plan including a future time series of a selected planned target vehicle and a future time series of a selected planned target lane position over a first predetermined period of time;
the vehicle operation plan determination operation including:
a vehicle group behavior prediction operation of predicting a future time series of a position set of a vehicle group over the first predetermined period according to a value of the vehicle operation plan, wherein the vehicle group includes the host vehicle and at least one neighboring detected vehicle;
a predicted-behavior evaluation operation of calculating a predetermined evaluation function of the predicted future time series of the position set of the vehicle group; and
a vehicle operation plan generation operation of selecting one vehicle operation plan with reference to calculated values of the predetermined evaluation function,
the vehicle group behavior prediction operation including:
a vehicle speed control logic operation of providing a normative value of a time series of a control input to the host vehicle over a second predetermined period of time in accordance with the value of the vehicle operation plan;
a host vehicle behavior prediction operation of predicting a time series of a position of the host vehicle over the first predetermined period in accordance with the normative value of the time series of the control input and the value of the vehicle operation plan; and
a detected neighboring vehicle behavior prediction operation of predicting a future time series of a position of the at least one neighboring detected vehicle over the first predetermined period, wherein the vehicle operation support method further comprises an output operation of regulating the control input in accordance with a control input command, wherein the control operation includes:
a target vehicle determination operation of selecting a current target vehicle in accordance with the vehicle operation plan; and
a control input determination operation of setting the control input command to a normative value of the control input in accordance with the selection of the current target vehicle,
wherein the control input includes a longitudinal acceleration of the host vehicle, wherein the control input determination operation is configured to set a longitudinal acceleration command to a normative value of the longitudinal acceleration in accordance with the selection of the current target vehicle, and wherein the output operation is configured to regulate the longitudinal acceleration by adjusting a wheel torque of the host vehicle in accordance with the longitudinal acceleration command.

10. The vehicle operation support method as claimed in claim 9, wherein the input operation includes:
a host vehicle speed measurement operation of measuring a vehicle speed of the host vehicle; and a desired vehicle speed setting operation of setting a desired vehicle speed of the host vehicle, and wherein the control input determination operation is configured to set the control input command so as to provide a desired inter-vehicle distance between the host vehicle and the current target vehicle when the current target vehicle is present, and to set the control input command so as to adjust the vehicle speed to the desired vehicle speed when the current target vehicle is absent.

11. The vehicle operation support method as claimed in claim 9, wherein the target vehicle determination operation is configured to determine the current target vehicle to be identical to a current selected planned target vehicle in accordance with the vehicle operation plan.

12. The vehicle operation support method as claimed in claim 9, wherein the input operation includes:

a host vehicle speed measurement operation of measuring a vehicle speed of the host vehicle; and a desired vehicle speed setting operation of setting a desired vehicle speed of the host vehicle, and wherein the vehicle speed control logic operation is configured to set the normative value of the control input so as to control an inter-vehicle distance between the host vehicle and the planned target vehicle when the planned target vehicle is present, and to set the normative value of the control input so as to adjust the vehicle speed to the desired vehicle speed when the planned target vehicle is absent.

13. The vehicle operation support method as claimed in claim 9, wherein the position of the host vehicle includes a longitudinal position and a lateral position of the host vehicle, and wherein the position of each neighboring detected vehicle includes a longitudinal position of the neighboring detected vehicle.

14. The vehicle operation support method as claimed in claim 9, wherein the detected neighboring vehicle behavior prediction operation is configured to predict a future time series of a longitudinal position and a lateral position of each neighboring detected vehicle over the first predetermined period, and wherein the vehicle operation plan determination operation is configured to determine the planned target vehicle by checking a vehicle predicted to move in front of or move into a path preceding the host vehicle.

15. A vehicle operation support method comprising:

an input operation including:
  a vehicle detection operation of detecting a vehicle present on a road where a host vehicle is present; and
  a lane detection operation of detecting a lane of the road; and a control operation including:
  a vehicle operation plan determination operation of determining a vehicle operation plan including a future time series of a selected planned target vehicle and a future time series of a selected planned target lane position over a first predetermined period of time;

the vehicle operation plan determination operation including:

a vehicle group behavior prediction operation of predicting a future time series of a position set of a vehicle group over the first predetermined period according to a value of the vehicle operation plan, wherein the vehicle group includes the host vehicle and at least one neighboring detected vehicle;

a predicted-behavior evaluation operation of calculating a predetermined evaluation function of the predicted future time series of the position set of the vehicle group; and a vehicle operation plan generation operation of selecting one vehicle operation plan with reference to calculated values of the predetermined evaluation function, the vehicle group behavior prediction operation including:

a vehicle speed control logic operation of providing a normative value of a time series of a control input to the host vehicle over a second predetermined period of time in accordance with the value of the vehicle operation plan;

a host vehicle behavior prediction operation of predicting a time series of a position of the host vehicle over the first predetermined period in accordance with the normative value of the time series of the control input and the value of the vehicle operation plan; and a detected neighboring vehicle behavior prediction operation of predicting a future time series of a position of the at least one neighboring detected vehicle over the first predetermined period, wherein the vehicle operation support method further comprises a display operation of presenting a recommended vehicle operation of the host vehicle in accordance with the vehicle operation plan, wherein the recommended vehicle operation includes a recommended longitudinal acceleration of the host vehicle and a recommended lane selection of the host vehicle.

16. The vehicle operation support method as claimed in claim 15, further comprising a warning operation of generating a warning signal when the vehicle operation plan includes a change in one of the selected planned target vehicle and the selected planned target lane position within the first predetermined period.

* * * * *